United States Patent [19]
Lupien et al.

[11] Patent Number: 5,845,266
[45] Date of Patent: Dec. 1, 1998

[54] CROSSING NETWORK UTILIZING SATISFACTION DENSITY PROFILE WITH PRICE DISCOVERY FEATURES

[75] Inventors: William A. Lupien, Hesperus; John T. Rickard, Durango, both of Colo.

[73] Assignee: Optimark Technologies, Inc., Durango, Colo.

[21] Appl. No.: 571,328

[22] Filed: Dec. 12, 1995

[51] Int. Cl.[6] .................................................. G06F 17/60
[52] U.S. Cl. .................................. 705/37; 705/35; 705/36
[58] Field of Search .......................... 364/709.04, 710.04; 395/201, 235, 236, 237, 326, 329, 339, 340, 355, 925, 961, 962

[56] References Cited

U.S. PATENT DOCUMENTS

| | | | |
|---|---|---|---|
| 3,573,747 | 4/1971 | Adams et al. | 395/237 |
| 3,581,072 | 5/1971 | Nymeyer | 395/237 |
| 4,334,270 | 6/1982 | Towers | 395/236 |
| 4,412,287 | 10/1983 | Braddock, III | 395/237 |
| 4,674,044 | 6/1987 | Kalmus et al. | 395/237 |

(List continued on next page.)

FOREIGN PATENT DOCUMENTS

| | | | |
|---|---|---|---|
| 0 512 702 A2 | 11/1992 | European Pat. Off. | G06F 15/21 |
| 2 275 796 | 9/1994 | United Kingdom | G06F 15/30 |
| 2 277 389 | 10/1994 | United Kingdom | G06F 15/30 |
| WO 9605563A1 | 2/1996 | WIPO | G06F 17/60 |

OTHER PUBLICATIONS

McFarland, Margaret, Deputy Secretary, Division of Market Regulation, SEC Release No. 34–34469; File No. SR–CHX–93–19, "Self Regulatory Organizations, Notice of Amendment Nos. 1,2,3 and 4 to Proposed Rule Change by Chicago Stock Exchange, Inc. Relating to the Creation of the Chicago Match System" Federal Register vol. 59, No. 150, Aug. 1994.

Katz, Jonathan G., Secretary, Division of Market Regulation, SEC Release No. 34–33542; File No. SR–CHX–93–19, "Self–Regulatory Organizations; Proposed Rule Change by Chicago Stock Exchange, Incorporated Proposing to Establish Rules for an Institutional Trading System, Called the Match Market Exchange Facility" Federal Register vol. 59, No. 24, Jan. 1994.

(List continued on next page.)

*Primary Examiner*—Robert A. Weinhardt
*Assistant Examiner*—Stephen R. Tkacs
*Attorney, Agent, or Firm*—Kenyon & Kenyon

[57] ABSTRACT

A crossing network that matches buy and sell orders based upon a satisfaction and quantity profile includes a number of trader terminals that can be used for entering orders. The orders are entered in the form of a satisfaction density profile that represents a degree of satisfaction to trade a particular instrument at various (price, quantity) combinations. Typically, each order is either a buy order or a sell order. The trader terminals are coupled to a matching controller computer. The matching controller computer can receive as input the satisfaction density profiles entered at each one of the trading terminals. The matching controller computer matches orders (as represented by each trader's satisfaction density profile) so that each trader is assured that the overall outcome of the process (in terms of average price and size of fill) has maximized the mutual satisfaction of all traders. Typically, the matching process is anonymous. The matching process can be continuous or a batch process, or a hybrid of the two. Unmatched satisfaction density profiles can be used to provide spread and pricing information. Factors other than price and quantity also may be used to determine the degree of satisfaction. Optionally, priority may be given to certain profiles in the matching process to accommodate stock exchange rules, for example, requiring that priority be given to orders exhibiting the best price, regardless of size or any other consideration.

16 Claims, 17 Drawing Sheets

U.S. PATENT DOCUMENTS

| | | | |
|---|---|---|---|
| 4,677,552 | 6/1987 | Sibley, Jr. | 395/237 |
| 4,694,397 | 9/1987 | Grant et al. | 395/242 |
| 4,751,640 | 6/1988 | Lucas et al. | 395/236 |
| 4,903,201 | 2/1990 | Wagner | 395/237 |
| 5,077,665 | 12/1991 | Silverman et al. | 395/237 |
| 5,101,353 | 3/1992 | Lupien et al. | 395/237 |
| 5,136,501 | 8/1992 | Silverman et al. | 395/237 |
| 5,283,731 | 2/1994 | Lalonde et al. | 395/201 |
| 5,375,055 | 12/1994 | Togher et al. | 395/237 |

OTHER PUBLICATIONS

Colby, Robert L.D., Deputy Director, Division of Market Regulation, Letter from Deputy Director to the Chicago Stock Exchange regarding trading of a new basket product "the Chicago Basket" (CMX Basket) dated Oct. 1993 and Simon, George T., Letter on behalf of the Chicago Stock Exchange requesting interpretation of and exemptive relief from various provisions of the Securities Exchange Act of 1934 and certain rules promulgated thereunder in connection with the trading on the Exchange of groups of equity securities (Basket) dated Sep. 1993.

| PRICE \ SIZE | 20M | 40M | 60M | 80M | 100M | 120M | 140M | 160M | 180M | 200M | 220M | 240M | 260M | 280M | 300M |
|---|---|---|---|---|---|---|---|---|---|---|---|---|---|---|---|
| 101.000 | 1.0 | 1.0 | 1.0 | 1.0 | 1.0 | 1.0 | 1.0 | 1.0 | 1.0 | 1.0 | 1.0 | .00 | .00 | .00 | .00 |
| 100.875 | 1.0 | 1.0 | 1.0 | 1.0 | 1.0 | 1.0 | 1.0 | 1.0 | 1.0 | 1.0 | 1.0 | .00 | .00 | .00 | .00 |
| 100.750 | 1.0 | 1.0 | 1.0 | 1.0 | 1.0 | 1.0 | 1.0 | 1.0 | 1.0 | 1.0 | 1.0 | .00 | .00 | .00 | .00 |
| 100.625 | 1.0 | 1.0 | 1.0 | 1.0 | 1.0 | 1.0 | 1.0 | 1.0 | 1.0 | 1.0 | 1.0 | .00 | .00 | .00 | .00 |
| 100.500 | 1.0 | 1.0 | 1.0 | 1.0 | 1.0 | 1.0 | 1.0 | 1.0 | 1.0 | 1.0 | 1.0 | .00 | .00 | .00 | .00 |
| 100.375 | 1.0 | 1.0 | 1.0 | 1.0 | 1.0 | 1.0 | 1.0 | 1.0 | 1.0 | .00 | .00 | .00 | .00 | .00 | .00 |
| 100.250 | 1.0 | 1.0 | 1.0 | 1.0 | 1.0 | 1.0 | .00 | .00 | .00 | .00 | .00 | .00 | .00 | .00 | .00 |
| 100.125 | 1.0 | 1.0 | 1.0 | 1.0 | .00 | .00 | .00 | .00 | .00 | .00 | .00 | .00 | .00 | .00 | .00 |
| 100.000 | 1.0 | 1.0 | .00 | .00 | .00 | .00 | .00 | .00 | .00 | .00 | .00 | .00 | .00 | .00 | .00 |
| 99.875 | .67 | .67 | .33 | .00 | .00 | .00 | .00 | .00 | .00 | .00 | .00 | .00 | .33 | .67 | 1.0 |
| 99.750 | 1.0 | 1.0 | .67 | .33 | .00 | .00 | .00 | .00 | .00 | .00 | .00 | .00 | .33 | .67 | 1.0 |
| 99.625 | 1.0 | 1.0 | 1.0 | .67 | .33 | .00 | .00 | .00 | .00 | .00 | .00 | .00 | .33 | .67 | 1.0 |
| 99.500 | 1.0 | 1.0 | 1.0 | 1.0 | .67 | .33 | .17 | .00 | .00 | .00 | .00 | .00 | .33 | .67 | 1.0 |
| 99.375 | 1.0 | 1.0 | 1.0 | 1.0 | 1.0 | .67 | .33 | .00 | .00 | .00 | .00 | .00 | .33 | .67 | 1.0 |
| 99.250 | 1.0 | 1.0 | 1.0 | 1.0 | 1.0 | 1.0 | .50 | .00 | .00 | .00 | .00 | .00 | .33 | .67 | 1.0 |
| 99.125 | 1.0 | 1.0 | 1.0 | 1.0 | 1.0 | 1.0 | 1.0 | 1.0 | 1.0 | 1.0 | 1.0 | 1.0 | .33 | .67 | 1.0 |
| 99.000 | 1.0 | 1.0 | 1.0 | 1.0 | 1.0 | 1.0 | 1.0 | 1.0 | 1.0 | 1.0 | 1.0 | 1.0 | .33 | .67 | 1.0 |

CROSSING NETWORK UTILIZING SATISFACTION DENSITY PROFILE WITH PRICE DISCOVERY FEATURES

FIELD OF INVENTION

The present invention is directed to an automated crossing network (also known as a matching system) for trading instruments, and in particular, a continuous crossing network that matches buy and sell orders based upon a satisfaction and size profile and that can output price discovery information.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

Traditionally, traders and investors who desired to buy or sell securities placed orders with brokers who traded on the floor of organized stock exchanges, such as the New York Stock Exchange or the NASDAQ market. Traders and investors, particularly institutional investors, are increasingly balking at the high cost of trading on organized exchanges and in the OTC (Over-The-Counter) market. Discontent with the expense of using intermediaries and the cost of market impact has contributed to the development of the electronic fourth market for crossing trades. See "Reshaping the Equity Markets, A Guide for the 1990s" by Robert A. Schwartz, Harper Business, 1991, especially at pp. 93–95.

Various companies and exchanges operate computerized crossing networks, also called anonymous matching systems. By way of example, crossing networks used in connection with the trading of trading instruments are disclosed in U.S. Pat. No. 4,412,287, which discloses an automated stock exchange in which a computer matches buy and sell orders for a variety of stocks; U.S. Pat. No. 3,573,747, which discloses an anonymous trading system for selling fungible properties between subscribers to the system; U.S. Pat. No. 3,581,072, which discloses the use of a special purpose digital computer for matching orders and establishing market prices in an auction market for fungible goods; U.S. Pat. No. 4,674,044, which discloses an automated securities trading system; U.S. Pat. No. 5,136,501, which discloses an anonymous matching system for effectuating trades through automatic matching in which buyers and sellers who are willing to trade with one another based on specified criteria, such as price, quantity and credit, may automatically trade when matching events occur satisfying these criteria; and U.S. Pat. No. 5,101,353, which discloses an automated system for providing liquidity to securities markets in which orders are entered by the system and executed in real time either internally between system users or externally with stock exchanges and markets.

Crossing networks have a number of advantages, including: (a) traders need not search for a contraparty; and (b) anonymity is preserved.

Existing facilities for crossing trades include Instinet's Crossing Network and POSIT (Portfolio System for Institutional Trading) which is owned by ITG, Inc. The Instinet Crossing Network has an equities trading service to match buyers and sellers anonymously at set times. Computers pair buyers with sellers on a time priority basis. Trades are executed at the closing price for exchange-listed issues, and at the midpoint of the inside market (best bid and ask) for OTC issues.

POSIT, for example, enables large investors to trade baskets of stocks among themselves. The orders are sent to a central computer where they are electronically matched with other orders. Unlike Instinet's Crossing Network, POSIT crosses are done at discreet times during the day. The prices are obtained from those quoted on the exchanges, a practice known as "parasitic pricing." See "Reshaping the Equity Markets, A Guide for the 1990s" cited above.

Instinet, owned by Reuters, also operates an electronic trading system that facilitates the negotiation of trades between institutional investors and brokers. Instinet allows parties to trade anonymously, entering bids and offers electronically. Instinet subscribers can respond to an "order" entered into the system either by matching a displayed price or by making a counter bid or offer that is transmitted electronically to the counter parties. The trades that result from these negotiations become public information only when they are executed. This procedure provides an alternative to the direct human-to-human negotiation of orders in the upstairs market or on the trading floors. Instinet provides a limit order book for over-the-counter (OTC) securities and listed securities and also provides inside quotes for exchange listed securities for the seven U.S. exchanges on which stocks can be traded and for NASDAQ listed securities.

Many crossing networks function independently of existing stock exchanges. However, some crossing networks are operated by stock exchanges.

For example, the Market Match Exchange ("MMX") is operated by the Chicago Stock Exchange. All matched orders are executed at a random time within a predetermined ten minute window at the market price at such time. The market price is calculated based upon the midpoint of the spread of a particular issue. Rather than matching orders on the basis of time priority, the MMX system uses liquidity fees and liquidity credits to determine the level of priority for order matching. Those users willing to pay the highest liquidity fee have the highest execution priority. See 59 F.R. 5451 (Feb. 4, 1994).

Crossing networks that automatically match buy and sell orders often concentrate trading at a single point of time, and can be called a batch process matching system. There is a need, however, for an anonymous crossing network that continuously, and in real-time, satisfies the buying and selling desires of an arbitrary number of market participants.

A major problem encountered in the design of crossing networks is that of determining how to match buyers and sellers. Existing approaches to this problem include:

Take-out strategies, where overlapping bids and offers are matched at the midpoint of the overlapped bid and ask prices, with priority given to buyers and sellers in order of price. This assumes a significant quantity of non-disclosed orders in the system; otherwise, there would be no incentive for overlap, and take-out would start at the disclosed best bid/offer prices, just like the Instinet book.

Single price auction strategies, where a single, size-weighted average price is computed from overlapping bid and offer prices, and everyone is filled at that price. Again, traders would have to be confident of a significant number of non-disclosed orders in the system to have the incentive to enter orders at a better price than the best disclosed price.

Premium strategies (as in the Chicago MMX system), where bids and offers have an associated positive or negative premium, and crossing takes place at the midpoint of market spread or at the minimum necessary premium differential from the midpoint, with priority given in order of premium. Here, the premium-based priority in matching provides the incentive for offering higher premiums.

Each of the above approaches is a batch process that relies upon ad hoc rules of competition among a relatively small set of discrete orders as being the means of arbitrating the crossing network participants' buy/sell entries.

In the real world of trading, orders to buy or sell can enter the market at any time, and discrete orders often represent only an approximate and partial expression of the order fill that would satisfy the trader. For institutional traders in particular, an individual order seldom represents the full desired fill size, and the trader must then employ multiple orders at different prices (and generally in different markets) to achieve his ultimate fill.

Typically, existing crossing networks allow discrete buy or sell orders to be entered, e.g., "sell 10,000 IBM at 64." However, as stated above many traders, particularly institutional traders, wish to deal in baskets of securities, so that, for example, a portfolio is as far as possible, "balanced." Existing crossing networks do not easily allow traders to enter combinations of orders, such as "sell 10,000 IBM at 64 only if I can buy 20,000 DEC at 32". Furthermore, existing crossing networks do not allow traders to enter combinations of orders, such as "sell 10,000 IBM at 64 or sell 100,000 IBM at 63." Traders often have trading strategies such as, for example, "buy 3,000 IBM at 63, but if I can buy 5,000, I would be prepared to pay 63 and ½", that cannot be handled by existing crossing networks.

Given the above limitations of conventional crossing networks, a more satisfactory approach to the overall problem of continuously satisfying the buying and selling desires of an arbitrary number of market participants is needed. Furthermore, a crossing network is needed that will guarantee mathematical optimality of the matching process, so that each participant is assured that the overall outcome of the process (in terms of the price and size of all fills) has maximized the joint satisfaction of all participants.

Price discovery is an important market feature, but in many markets, is often not explicit. The call market opening procedure used on the NYSE, for example, enables determination of an opening price. Further, consolidation of the public order flow on the trading floor of the NYSE gives the exchange specialists a more comprehensive knowledge of buy/sell propensities in the broader market for an issue. The OTC market does not have an explicit price discovery mechanism, such as the call market opening procedure used by the NYSE. OTC dealers sense the public's buy/sell propensities by posting quotes and observing the market's response. Moreover, existing crossing networks use parasitic pricing methods, and therefore depend on the existence of another market in the same instruments.

SUMMARY OF THE INVENTION

The present invention is directed to a computerized crossing network that allows traders to input as orders a satisfaction density profile and maximum size limit which at once characterizes the trader's degree of satisfaction to trade at any and all prices and sizes, up to the aggregate (or size) limit, and that matches orders (as represented by each trader's satisfaction density profile) so that each trader is assured that the overall outcome of the process (in terms of average price and size of fill) has maximized the mutual satisfaction of all traders.

The satisfaction density profile is a two-dimensional grid or matrix (which could also be represented as a two-dimensional graph or in another two-dimensional format), one dimension being price and the second dimension being size of transaction, that as a whole characterizes the trader's degree of satisfaction for a transaction at each (price, size) coordinate. Each element of the satisfaction density profile, called a satisfaction density value, indicates the trader's degree of satisfaction to trade that size order at that price. In the representative embodiment, each satisfaction density value is a number between zero and one, with zero representing no satisfaction (i.e., will under no circumstances trade that quantity at that price) and one representing total satisfaction.

Each trader can input one or more satisfaction density profiles. In the representative embodiment, each satisfaction density profile can be represented and input as a graph of at least two dimensions, such as, for example, as a temperature grid or two dimensional matrix.

Once the satisfaction density profile is complete, the trader causes the satisfaction density profile to be transmitted to a central matching controller ("CMC"), which anonymously matches buy and sell orders as discussed below.

For the purpose of explanation, assume a batch process in which multiple traders enter satisfaction density profiles that represent either buy or sell orders for a particular stock. Upon transmission of the satisfaction density profiles to the CMC, the CMC will cause buy profiles to be stored in a buy profile database and sell profiles to be stored in a sell profile database. The CMC will then calculate, for every buyer/seller profile pair, a mutual satisfaction cross product profile. The mutual satisfaction cross product profile represents the degree to which that buy/sell pair can satisfy each other at each grid value of price and size. Next, the individual grid values of the mutual satisfaction cross products for all buy/sell combinations are ranked in order, starting with the highest value of mutual satisfaction. The buy/sell orders represented by the ranked grid values of the mutual satisfaction cross products are then matched in order, and matching trades are aggregated by the CMC system. The matching process then continues down the ranked list.

The present invention can easily handle trades of baskets of securities. For example, in the representative embodiment, if a trader wishes to simultaneously both sell IBM and buy DEC, the trader would create a sell satisfaction density profile representing the IBM part of the transaction and a buy satisfaction density profile representing the DEC part of the transaction, and indicate that these profiles are to be linked together. The CMC will then link these two satisfaction density profiles. This linking process can be accomplished, for example, by utilizing a connection matrix and performing matrix manipulation on the two profiles. It will be apparent that other, more complex, linked trades can be accomplished in the same manner.

The present invention can be operated as a batch crossing network, where orders are matched at set times. Alternatively, the present invention can be operated as a continuous crossing network by treating each new satisfaction density profile that is entered as a triggering event that causes a new round of computation as described above.

The present invention also allows traders to create and input satisfaction density profiles, where the individual satisfaction density profile values entered are based upon external variables (e.g., for debt instruments, based upon current interest rate, coupon rate, quality of issuer, etc.) and variables other than price and quantity.

The present invention provides a richer means of price discovery than is available in any existing market structure, including exchanges. In steady-state operation, where all feasible matches have been performed and the system is awaiting the next profile input, there will exist a group of unfilled buy satisfaction density profiles and a group of unfilled sell satisfaction density profiles, with no overlap between the two groups (otherwise a match would be performed). The two-dimensional price/size region between these groups is denoted the "spread region," and depicts, at each value of size, the spread between the highest non-zero buy satisfaction profile price and the lowest non-zero sell satisfaction profile price. This depiction of the aggregate of unfilled satisfaction profiles is a significant generalization of the market quotes currently provided by exchanges and market makers, and obviates the need for parasitic pricing inherent in other crossing networks. It also provides substantially greater price discovery across the full range of trade sizes than is contained in the current quotations of best-bid and best-offering prices and corresponding sizes.

The present invention has features to permit operation in accordance with certain stock exchange rules. For example, some exchanges require priority to be given to orders exhibiting the best price, regardless of other factors. Accordingly, in such cases, the present invention can calculate a tentative allocation. Before making the allocation, the CMC will check to ascertain if there exist any contra profiles that, in accordance with exchange rules, must be executed prior to the tentative allocation.

BRIEF DESCRIPTION OF THE DRAWINGS

FIG. 2 is an example satisfaction density profile for a buy order.

FIGS. 9A and 9B illustrating typical displays of aggregate density profiles.

DETAILED DESCRIPTION

The present invention is described below in the context of trading equity securities. However, the invention is not so limited and can be easily adapted to allow the trading of other liquid assets such as futures, derivatives, options, bonds, currencies and the like. Accordingly, where the context permits, the terms "securities", "stock", and "shares" when used herein includes other instruments that can be traded, such as, for example, futures, derivatives, options, bonds and currencies. The terms "buy" and "sell" include, where appropriate, bid and offer, etc.

Intended users of the representative embodiment system of this invention are typically investors, such as institutional investors (e.g., a pension fund) but may also be individual investors, brokers or others who deal in or trade securities. As used herein, the term "user", "trader" or "investor" means that person or entity who wishes to make a trade.

Figure 1:
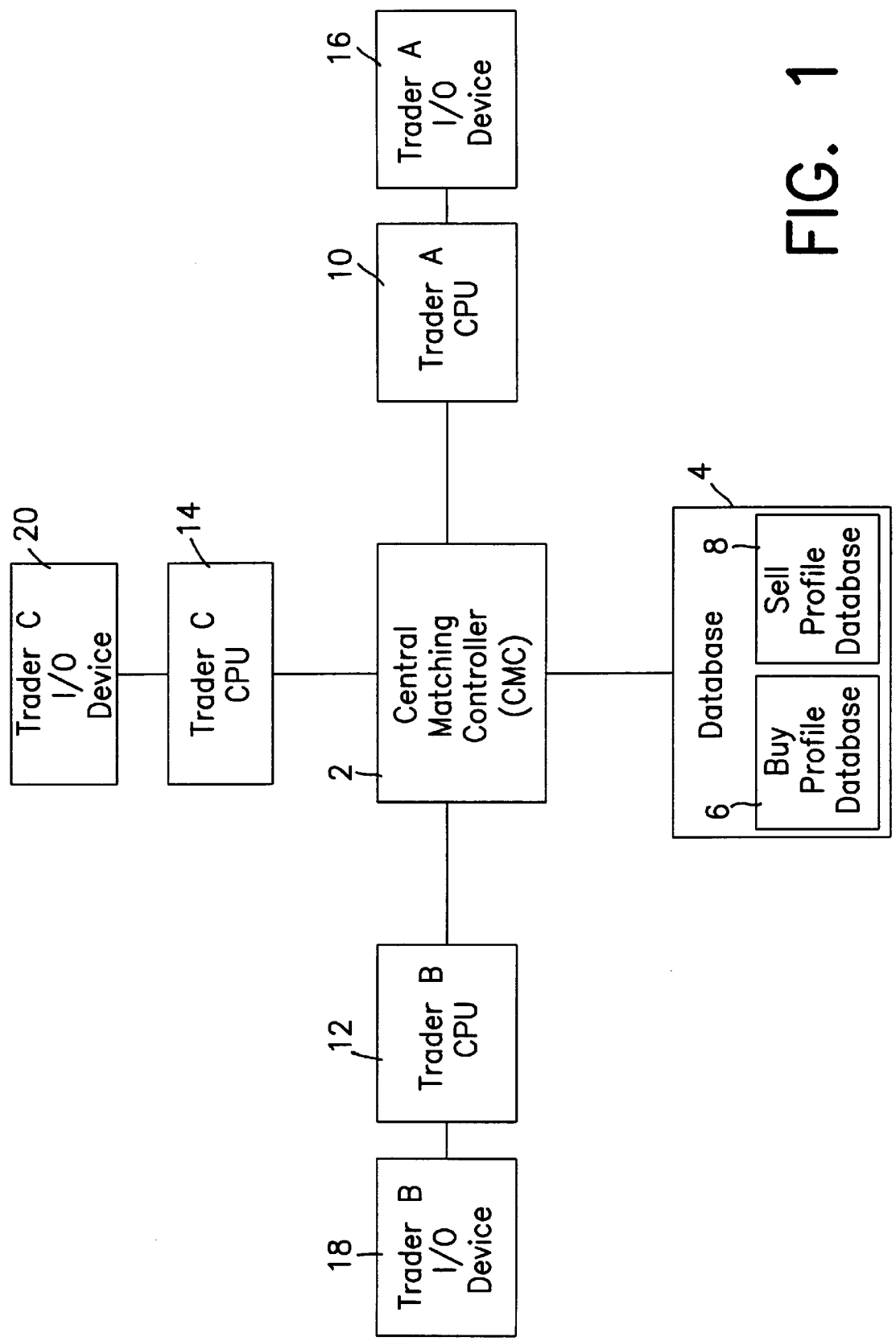
FIG. 1 is a block diagram of a representative system operating according to the present invention.

Referring now to the drawings, and initially FIG. 1, there is illustrated a block diagram of the overall architecture of the crossing network according to the present invention. A central matching controller ("CMC") 2 matches buy and sell orders transmitted to the CMC from various trader terminals, e.g., 10, 12, 14. The CMC 2 is preferably a supercomputer that can perform matrix calculations at rates of multiple gigaflops, such as, for example with present technology, an IBM SP2 or an Intel PARAGON supercomputer. A storage device 4 is coupled to the CMC 2. The storage device 4 comprises a database for storing buy and sell satisfaction density profiles. In the representative embodiment, buy satisfaction density profiles can be stored in a buy profile database 6 and sell satisfaction density profiles can be stored in a sell profile database 8.

Each trader who wished to trade will have access to a trader terminal, such as trader CPU 10, 12, 14. Ideally, the trader terminals 10, 12, 14 are high powered personal computers or workstations. The trader terminals 10, 12, 14 are coupled to the CMC 2. Trader terminals may be coupled to the CMC 2 over a wide area network (WAN) and/or over the Internet. Each trader terminal includes one or more input/output devices 16, 18, 20 that allow for the entry of satisfaction density profiles and the display of output, such as matching trades.

Figure 2:
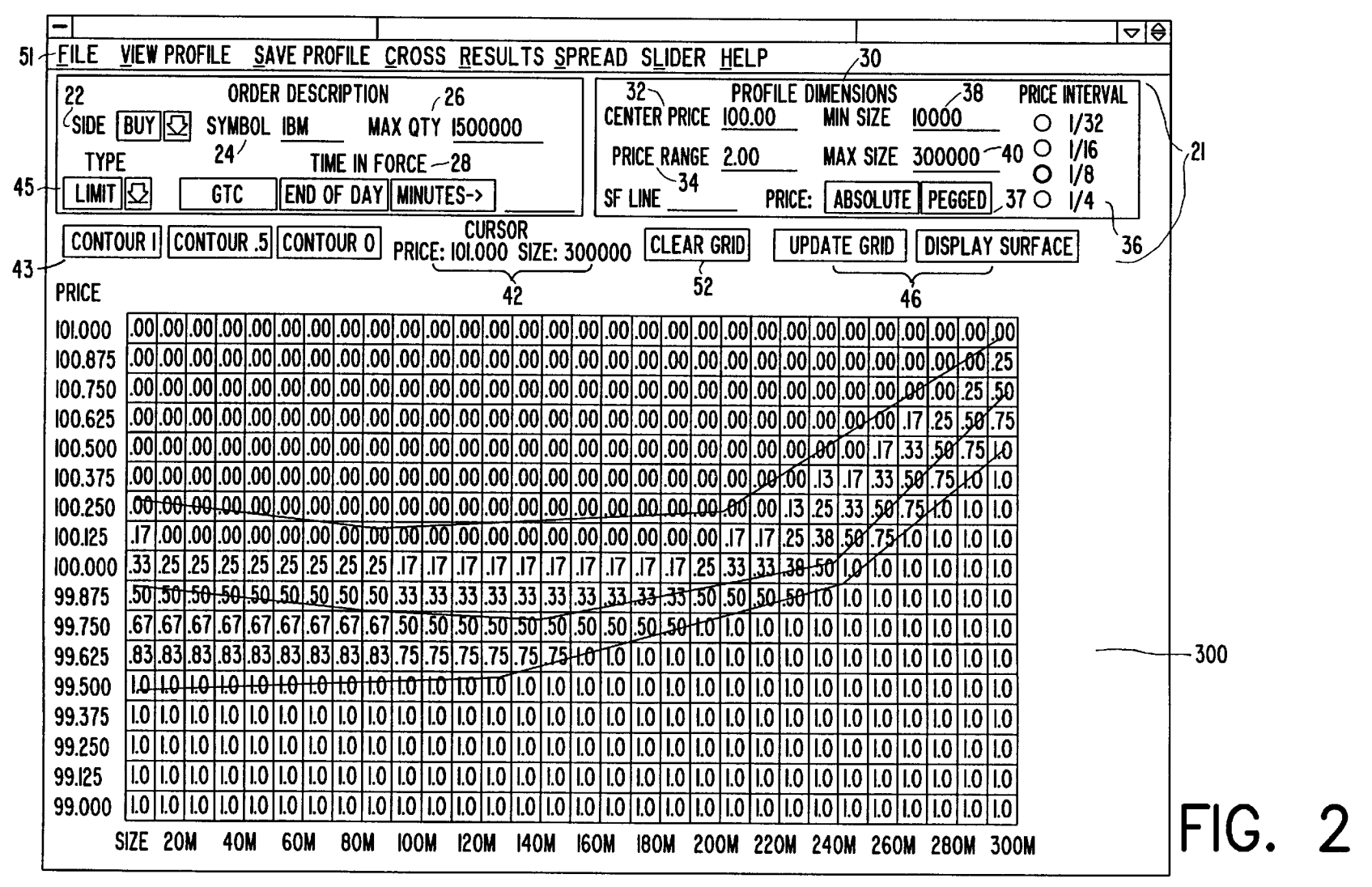

Turning now to FIG. 2, there is illustrated an example satisfaction density profile 300 for a sell order. (Also shown is an example interface window 21, discussed below, which is used to assist in the creation/specification of the satisfaction density profile.) In the representative embodiment, each security that a trader wishes to trade requires the creation of a satisfaction density profile, such as the one shown in FIG. 2 at 300. The satisfaction density profile as shown in FIG. 2 at 300 is a two-dimensional grid. Price is represented on the vertical axis and quantity is represented on the horizontal axis. (The ranges and scale of each axis can be set by the trader or automatically set by the present invention.) The satisfaction density levels are described by the numbers shown.

The satisfaction density profile characterizes the trader's range of interest in the transaction at each (price, size) combination. The trader can enter at each grid point on the satisfaction density profile a satisfaction density value, indicating the trader's willingness to trade that size order at that price. Entry of these satisfaction density values can be facilitated by a variety of graphical user interface tools. In the representative embodiment shown in FIG. 2, each satisfaction density value is a number between and including zero and one, with zero representing no satisfaction (i.e., will under no circumstances trade that quantity at that price) and one representing total satisfaction.

Thus, for example, FIG. 2 shows that the trader is fully willing to buy 100,000 at $99.50, but under no circumstances is willing to buy the same quantity at $100.125, or any quantity at $101.00. The satisfaction density value to buy 120,000 at $100 is 0.17, indicating a limited degree of satisfaction. FIG. 2 shows that the trader is more willing to buy 200,000 at $99.75 than 10,000 at $99.625.

The interface window 21 of FIG. 2 is an example user interface that can be used by a trader to set parameters when inputting or modifying a satisfaction density profile, such as 300 of FIG. 2. In the representative embodiment, the interface window 21 is displayed on an Input/Output device (e.g., 16, 18, 20). The interface window 21 in the representative embodiment can be manipulated according to standard graphical user interface (GUI) commands by a user using, for example, a mouse and a keyboard.

A Side indicator 22 allows the trader to set the type of transaction, e.g., buy, sell, sell short etc. A Symbol indicator 24 allows the trader to set the instrument being traded, e.g., for stocks, the ticker symbol; for futures, the futures symbol, etc. A Maximum Quantity indicator 26 allows the trader to set the maximum quantity to be traded. A type box 45 allows the trader to select a type of order, e.g., limit or market. In FIG. 2, the trader has entered a sell profile to sell a maximum quantity of 1,500,000 IBM shares.

The trader can also set a Time-in-Force indicator 28 that determines for how long the order will be valid. Examples of valid Time-in-Force settings include "good until canceled" (GTC), "good until end of day" (End of Day) and for a set period of time (e.g., minutes).

A Profile Dimensions section 30 (also known as a Surface Description section) of the interface window 21 allows the trader to define the dimensions of the satisfaction density profile. A Center Price parameter 32 is used to set the price that is displayed in the center of price axis of the satisfaction density profile. A Price Range parameter 34 shows the range for the price on the price axis. A Price Interval parameter 36 enables the trader to set the price interval (i.e., scale) on the price axis of the satisfaction density profile. For example, as shown in FIG. 2, the center price is set at 100 and the price range at 2. Thus, the price axis will vary from a price of 99 to a price of 101 (with 100 being in the center) in price increments of one eighth. A Price parameter 37 can be used to set whether the profile is absolute (e.g., does not vary with external parameters) or relative (e.g., is pegged such that the profile may translate in price and/or warp in shape as a function of external parameters, such as the bid/ask midpoint or the average price of the last match of that security).

A Min Size parameter 38 and a Max Size parameter 40 allows the trader to set the minimum and maximum limits for the quantity axis of the satisfaction density profile.

A Cursor Position segment 42 will display the coordinates (price, size) of the position of the cursor as the cursor is moved by the user over the satisfaction density profile being created.

Figure 7:
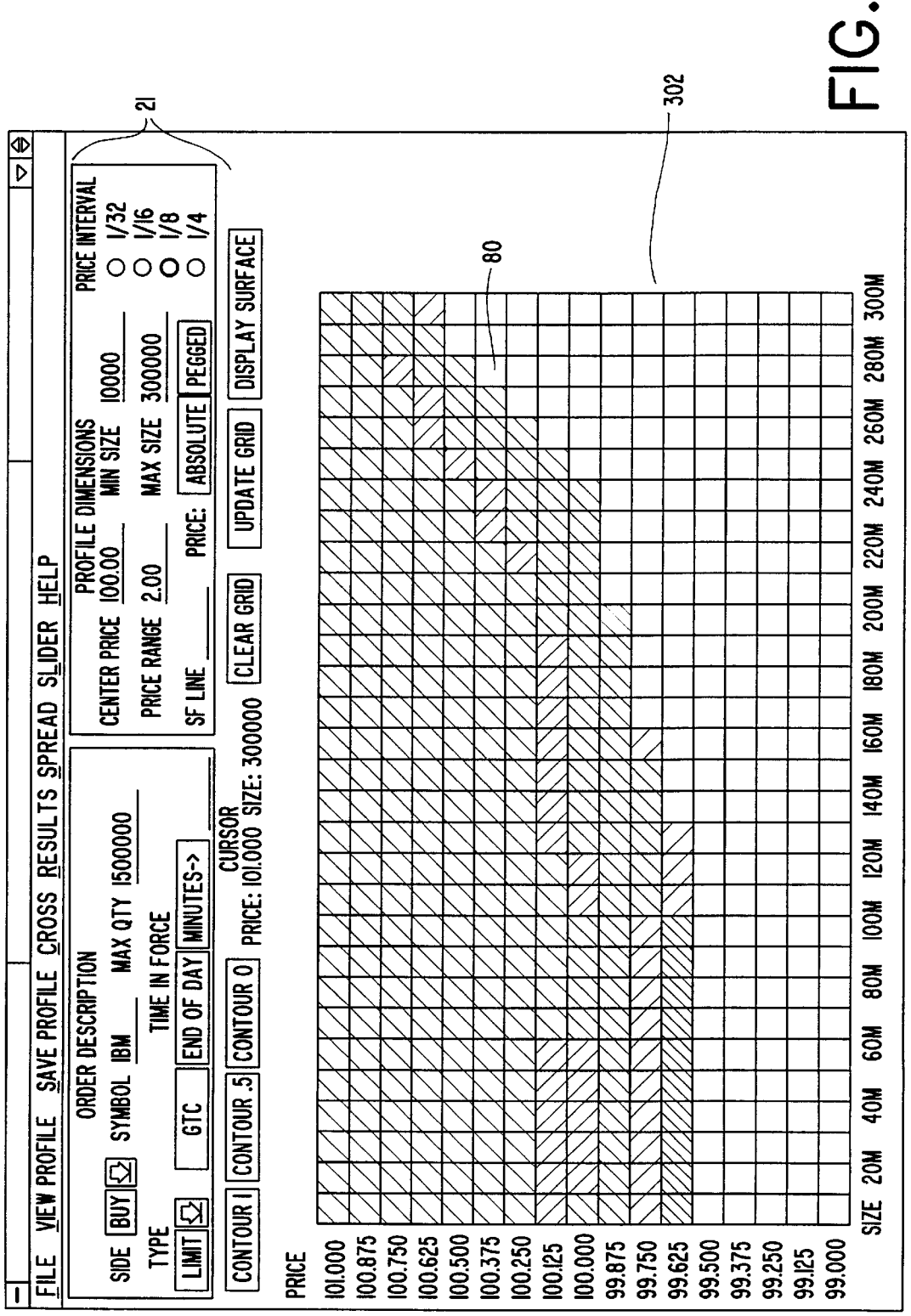
FIG. 7 is an example buy satisfaction density profile displayed as a temperature graph.

In the representative embodiment, there is a Display section 46 that has two buttons, namely, an Update Grid button and a Display Surface button. The Update Button will redraw the satisfaction density profile. The Display Surface button will allow the user to change the way the satisfaction density profile is displayed, e.g., as a contour plot (as shown in FIGS. 3A to 3D) or a temperature graph (as shown in FIG. 7 below).

Contour buttons 43 allow the user to input contour lines (e.g., the three lines shown on the satisfaction density (profile 300), each representing a satisfaction density value. In FIG. 2, there are three contour buttons, one each for satisfaction density values of 0, 0.5 and 1. In other embodiments, other values can be used for the contour buttons 43. When a trader selects a contour button 43, the present invention enters "draw mode" to allow the user to draw a line on the satisfaction density profile 300.

A menu bar 51 also allows traders to select commands, in the usual GUI fashion. For example, the menu bar 51 has a file menu (with commands such as load profile, save profile, delete profile, reset all profiles), a view profile menu command (also to load a profile), a save profile menu command (also to save a profile), a cross menu command (to submit a profile for execution), a results menu command (that displays a dialogue box listing trades that occurred), a spread menu command (to display market spread information as discussed below in FIG. 9) and a slider menu command (to translate and/or warp the profile values).

Figure 3A:
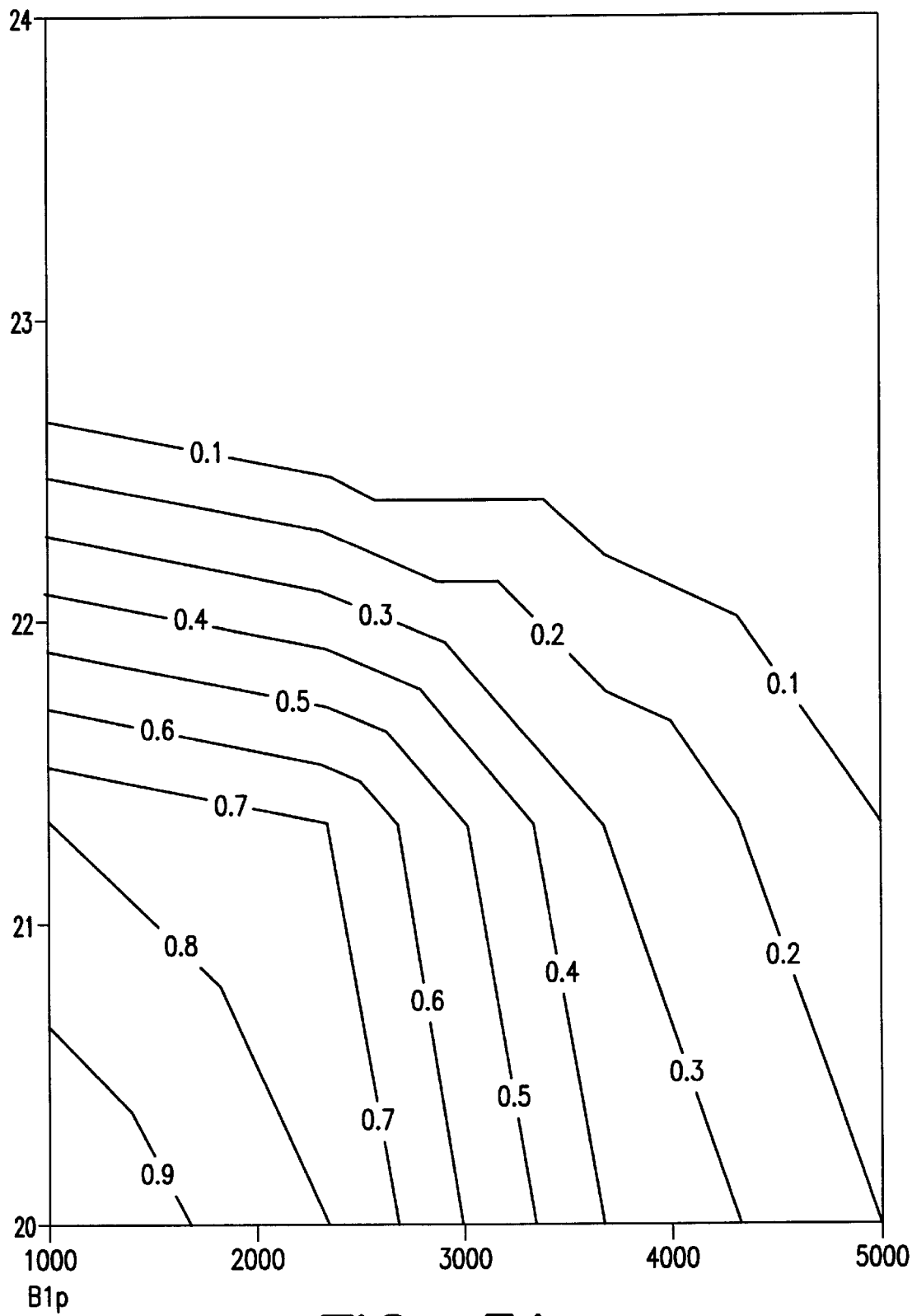
FIGS. 3A to 3D are example satisfaction density profiles in contour plot format.

In FIG. 3A, there is illustrated an example satisfaction density profile for a buy order. The satisfaction density profile as shown in FIG. 3A is a contour plot on a two-dimensional grid. Price is represented on the vertical axis and quantity is represented on the horizontal axis. The satisfaction density levels are described by the contours shown. In the representative embodiment of FIG. 3A, each satisfaction density value is a number between and including zero and one, with zero representing no satisfaction (i.e., will under no circumstances trade that quantity at that price) and one representing total satisfaction.

Thus, for example, FIG. 3A shows that the trader would be highly satisfied to buy 1,500 at $20.50, but under no circumstances is willing to buy any quantity at $24. The satisfaction density value for a buy of 3,000 at $20 is 0.6, indicating a more limited degree of satisfaction. FIG. 3A shows that the trader is more willing to buy 2,000 at $21 then 4,000 at $21.

Figure 3B:
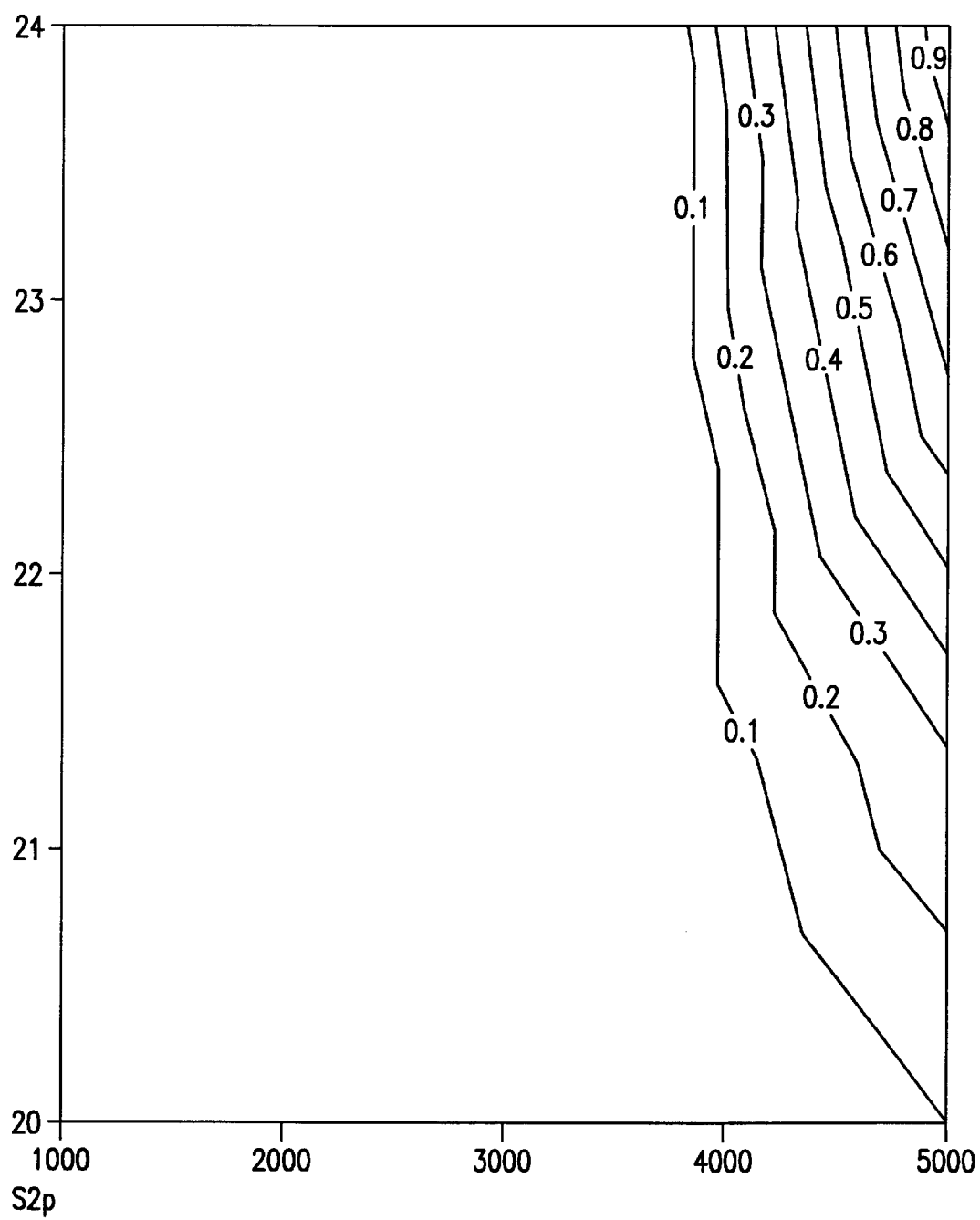

FIG. 3B shows an example satisfaction density profile for a sell transaction in the same format as the contour plot in FIG. 3A. The satisfaction density profile of FIG. 3B could represent, for example, an agency sell order.

Figure 3C:
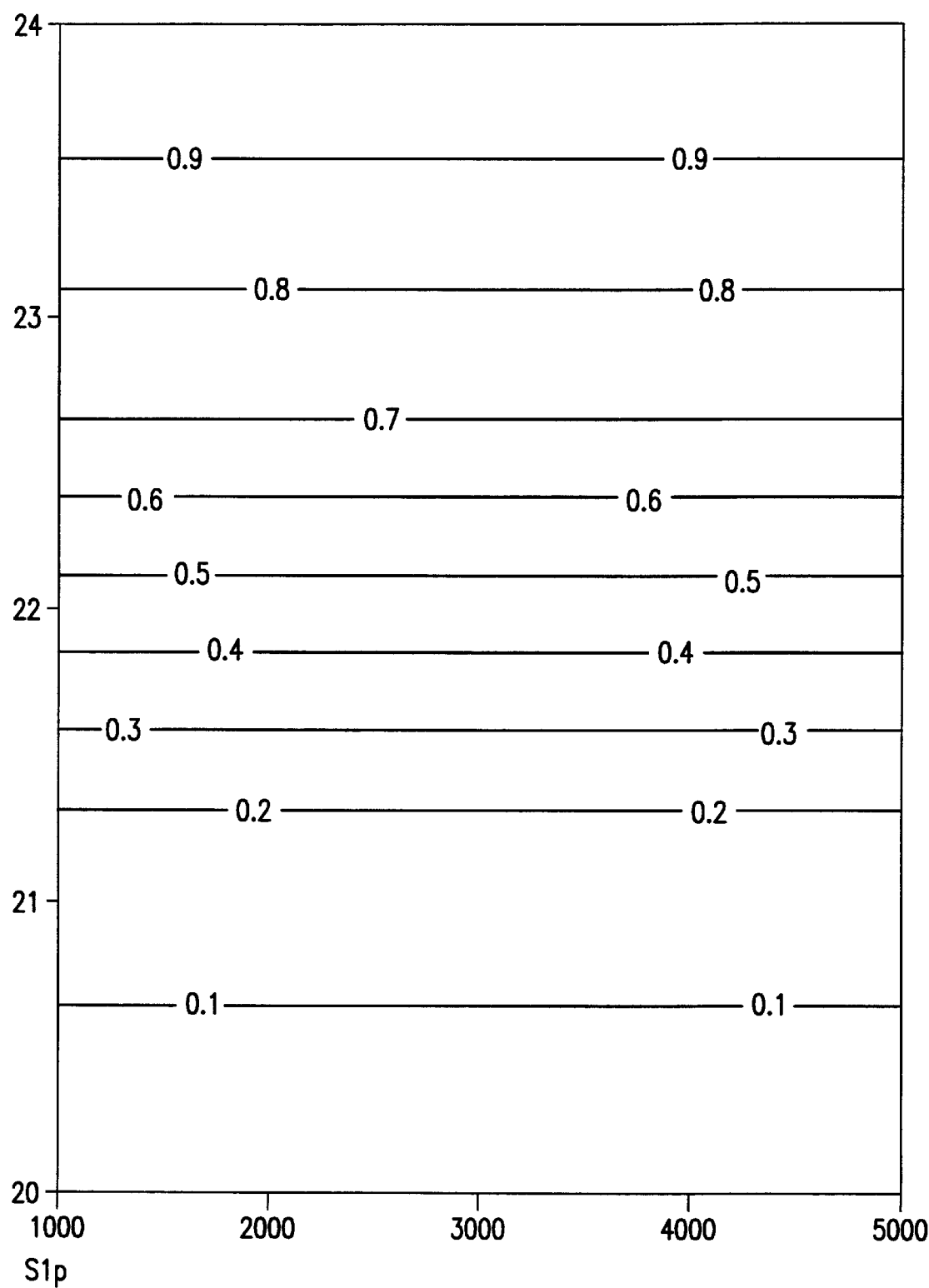

As another example, FIG. 3C shows a satisfaction density profile for a sell transaction. FIG. 3C illustrates a "soft" limit order.

Figure 3D:
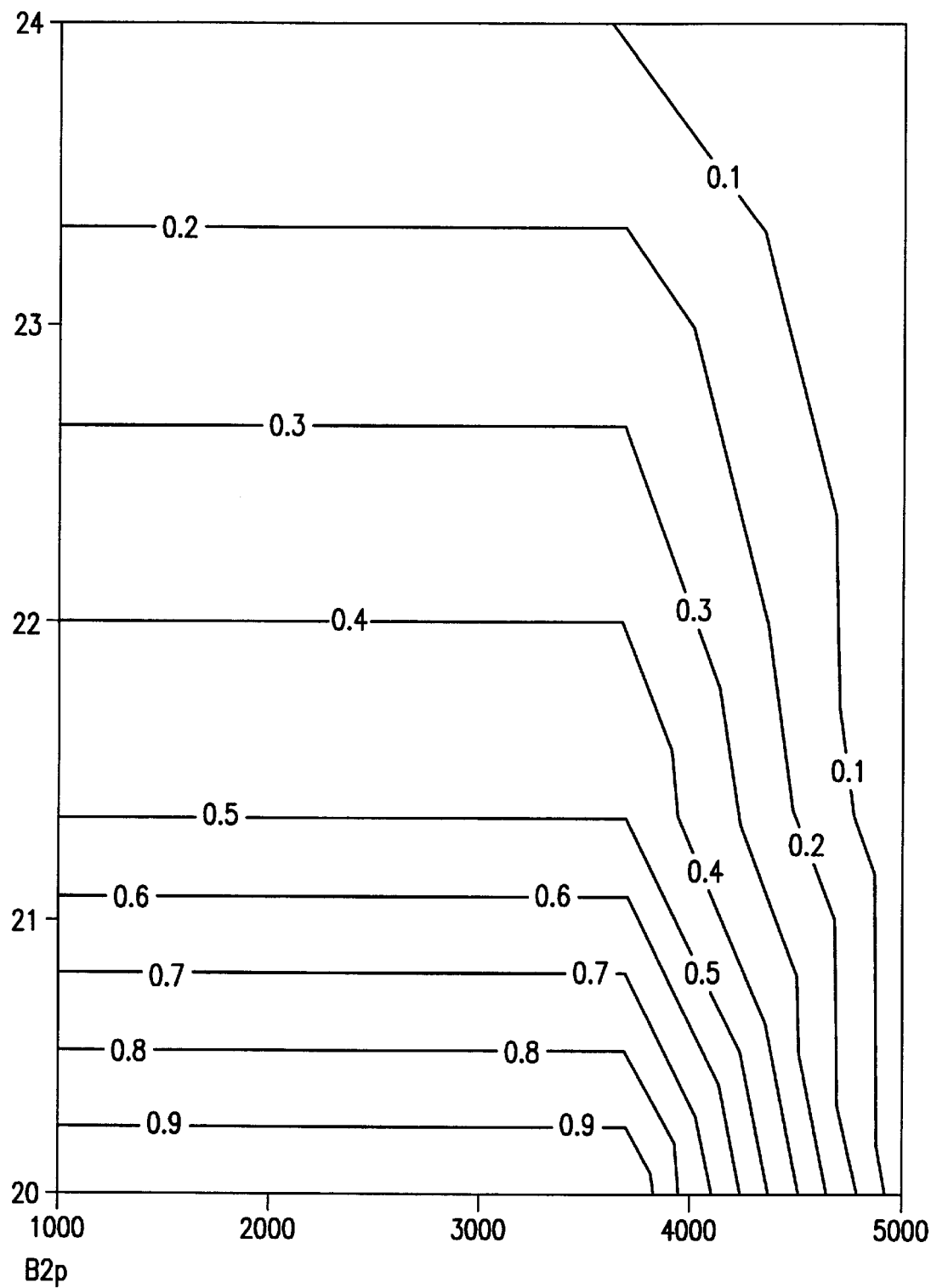

As another example, FIG. 3D shows a satisfaction density profile for a buy transaction.

Figure 4:
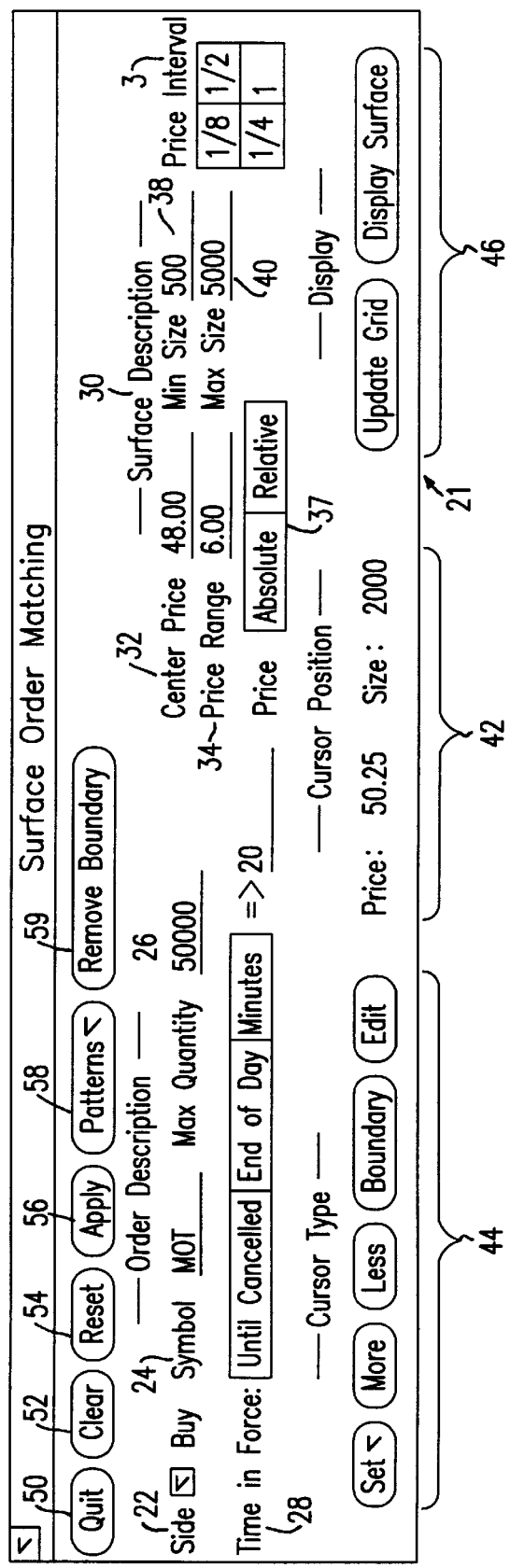
FIG. 4 is an example interface window, used to set parameters for and enable input of satisfaction density profiles.

Turning now to FIG. 4, there is illustrated another example interface window 21. It will be appreciated that the interface window 21 can have varying designs, all within the principles of the present invention. Reference numerals that correspond with those in FIG. 2 relate to items that have the same functionality as described above in FIG. 2. In FIG. 4, the trader has entered a buy profile to buy a maximum quantity of 50,000 Motorola shares.

Mismatches of grid resolution (e.g., due to different traders using different settings) is handled by interpolation to a common grid resolution. For example, the CMC 2 could determine the smallest grid resolution used and interpolate all coarser grid resolutions to that resolution. Alternatively, the CMC 2 could specify a minimum resolution (e.g. 100 shares and ⅛ in price) and interpolate all coarser grid resolutions to the specified minimum resolution.

In the embodiment shown in FIG. 4, a Cursor Type section 44 has a number of buttons to control the function of the cursor, for example, a set button, a more button, a less button, a boundary button and an edit button. The more and less buttons allow the user to increase or decrease the satisfaction density level on the satisfaction density profile at the location of the cursor. In the representative embodiment, the selected satisfaction density value is increased or deceased each time the mouse button is "clicked." The boundary button allows the user to create a boundary of satisfaction values, such as a zero satisfaction boundary, as discussed above at FIG. 2. The edit button allows the user to edit the boundary. The set button allows the user to set a satisfaction density value, so that each time the mouse is "clicked", the set value is placed in the satisfaction density profile at the location of the cursor.

In the representative embodiment, there is a Display section 46 that has two buttons, namely, an Update button and a Display Surface button. The Update Button will redraw the satisfaction density profile. The Display Surface button will allow the user to change the way the satisfaction density profile is displayed, e.g., as a contour plot (as shown in FIGS. 3A to 3D) or a temperature graph (as shown in FIG. 7 below).

The interface window 21 can also have a quit button 50, a clear button 52, a reset button 54 and an apply button 56. The quit button 50 enables a user to exit from the program that controls the interface window 21. The clear button 52 clears the display of the graph (e.g., the display of the satisfaction density profile) and all other parameter values, such as, for example, the Min Size parameter 38 and the Max Size parameter 40. The reset button 54 "undeletes" the most recent change to the graph, resetting the state of the graph to the immediately preceding state. The apply button 56, when selected, causes the satisfaction density profile to be submitted for matching. A remove boundary button 59, when selected, will remove all boundaries from the satisfaction density profile.

Figure 5:
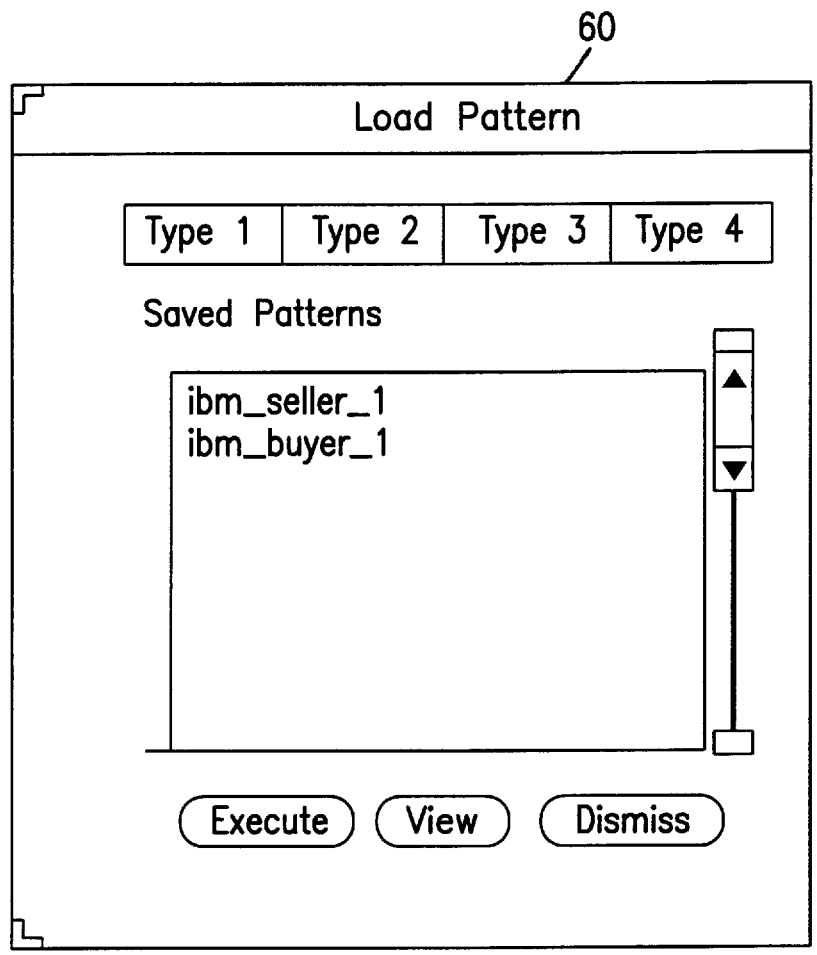
FIG. 5 is a load pattern interface window, used to load parameterized satisfaction density profile templates.

A patterns button 58 allows a user to retrieve pre-defined or user-defined parameterized templates for common types of satisfaction density profiles. Upon selection of the patterns button 58, a load pattern window 60 (as shown in FIG. 5) will be displayed, that allows the user to select saved patterns. In the example of FIG. 5, there are two saved patterns, namely ibm_seller_1 and ibm_buyer_1, that store patterns that enable a user to quickly load and use satisfaction density profiles to buy and sell IBM stock.

Certain common order types (e.g., market-maker quotes, limit orders, agency orders) can be expressed as parameterized templates that could be selected directly using the Patterns button 58 and the Load Pattern window 60. Once the corresponding template pops up on the display, the user could morph the display to suit the user's preferences as described below.

An even more elegant approach is to use a family of templates that represent two-dimensional basis functions for the surface profile. These functions can be selected from any of the standard two-dimensional orthogonal basis sets (e.g., Fourier, Cosine, Walsh-Hadamard, Haar transforms) or from more generalized and/or data specific basis functions such as those associated with the Gabor and other wavelet transforms or the Karhunen-Loeve transform. Analogous to their role in image data compression, the use of such functions as templates in this application would provide a substantially lower dimensional representation of the buy/sell surface profile, which in turn will correspondingly reduce the dimensionality of the coupling matrices needed to link together the profiles of multiple securities.

As will be appreciated, the entry of buy/sell profiles can be facilitated by a combination of a user-friendly graphical interface and user-tailorable templates. Those illustrated above are merely examples of the types of interfaces that could be used to enter satisfaction density values. In an alternative embodiment, the GUI would provide a set of tools for quickly entering buy/sell profile "peg point" values at selected price/size grid coordinates, along with an arbitrarily drawn boundary outside of which the profile values would be set to zero at all grid points. The CMC 2 would then calculate a two-dimensional (or multi-dimensional) profile that exactly matches the specified points and interpolates between these values to compute all other grid values. This interpolation can be accomplished by a number of mathematical algorithms, including but not limited to triangular tessellations, spline functions, and surface and/or contour plotting programs. The GUI would also include the ability to "morph" a surface profile created in this manner, using mouse hook-and-drag type operations or other similar methods, so that the profile can be altered by the user as desired to achieve a final configuration.

Figure 6:
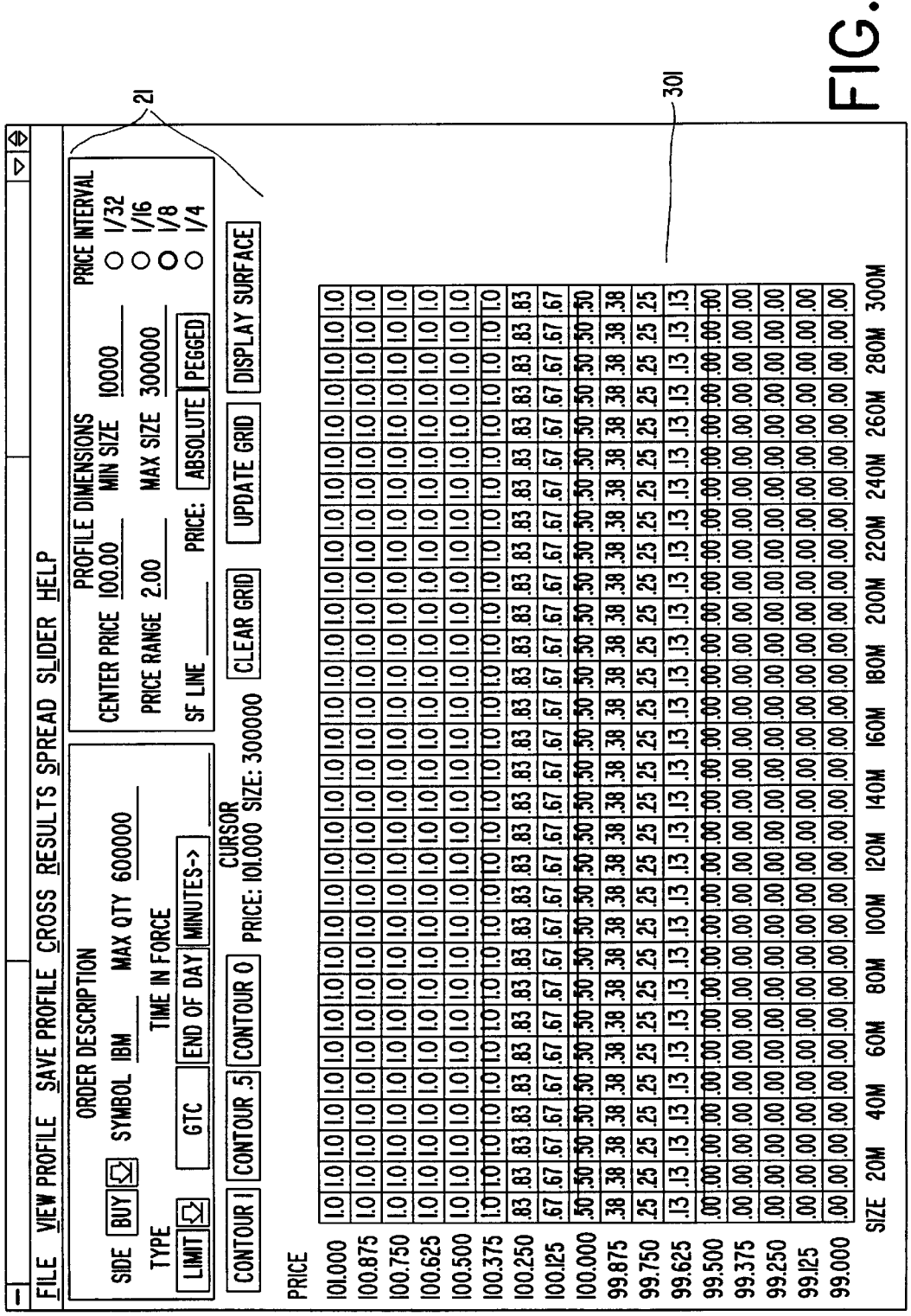
FIG. 6 is an example screen display showing an interface window and a satisfaction density profile for a sell order.

FIG. 6 shows another example of an interface window 21 and a sell satisfaction density profile 301.

FIG. 7 shows a buy satisfaction density profile displayed as a temperature graph 302. The user can cause any satisfaction density profile that has been inputted as a contour plot (or other representation) to be displayed in the form of a temperature graph by selecting the Display Surface button. In the representative embodiment, each (price, quantity) coordinate is represented by a colored square (e.g., 80), with the color of the square signifying the satisfaction density value. For example, in the representative embodiment, a satisfaction density value of 0 is represented by a black square, a satisfaction density value of 1 is represented by a white square, a satisfaction density value of 0.1 is represented by a blue square, a satisfaction density value of 0.5 is represented by a red square, a satisfaction density value of 0.9 is represented by a yellow square, and so on. Using this display, the trader can view the satisfaction density profile as a meaningful and colorful graphical display.

As shown in FIGS. 2, 3A–3D, 6 and 7, there are many ways and forms for creating and representing a satisfaction density profile on a computer interface and for inputting satisfaction density values.

Figure 8:
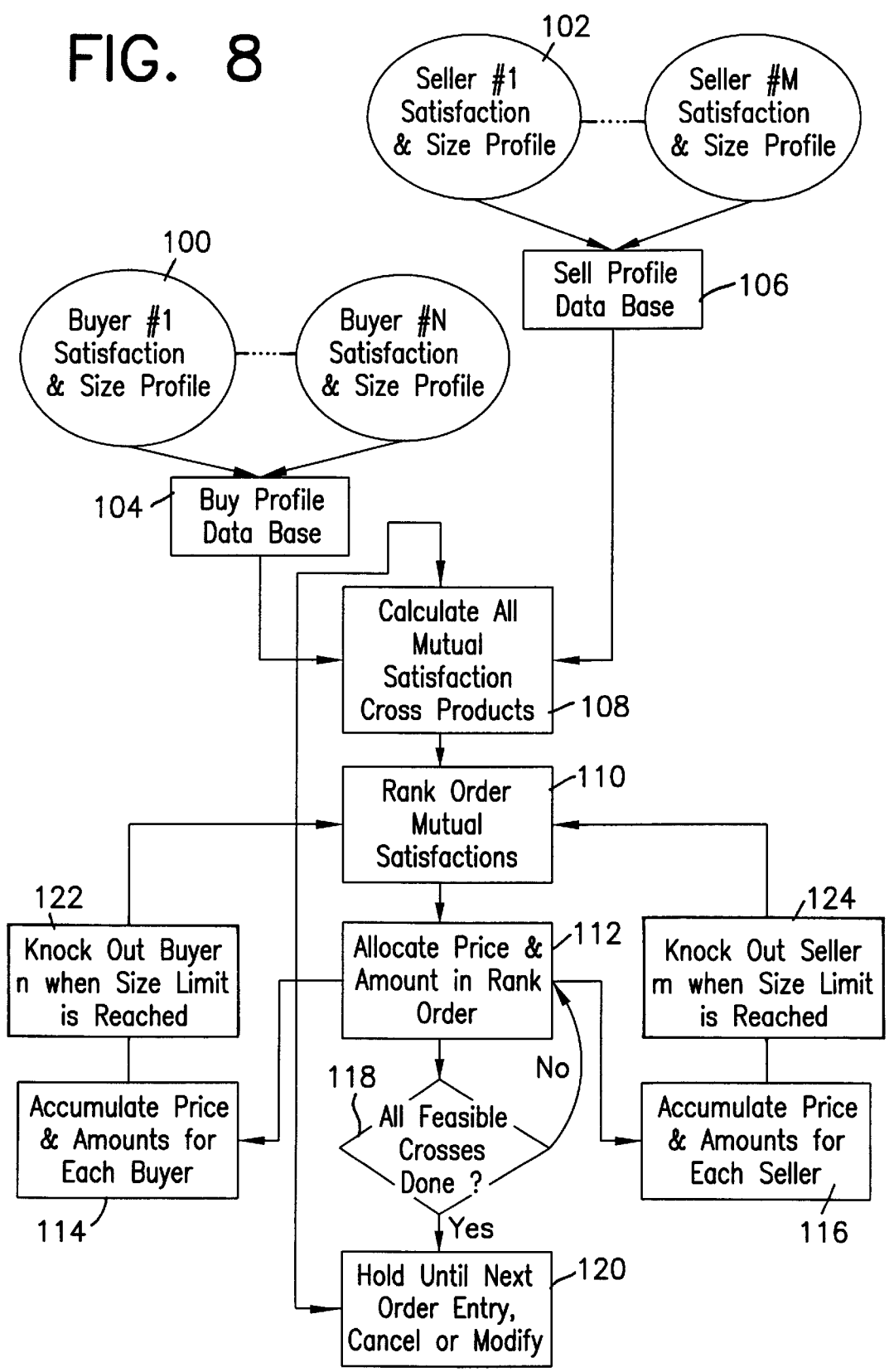
FIG. 8 is a description of the matching process in flow chart format.

FIG. 8 is a flow chart representing the overall steps performed in accordance with the present invention. Traders enter satisfaction density profiles, as discussed above, at steps 100 and 102. It will be appreciated that many traders can each enter one or more satisfaction density profiles. For convenience, FIG. 8 shows that the buy and sell profiles are entered at different steps (i.e., steps 100 and 102); however, the same interface (e.g., interface window 21) and terminals 10, 12, 14 are used for the input of both buy and sell profiles. In fact, steps 100 and 102 could conceptually be considered to be the same step, merely with differing data.

In the representative embodiment of the present invention, buy satisfaction density profiles, when ready for matching, are transmitted to the CMC 2 and stored in a buy profile database 6 (step 104). Sell satisfaction density profiles, when ready for matching, are transmitted to the CMC 2 and stored in a sell profile database 8 (step 106).

At step 108, the CMC 2 calculates, for each possible buy/sell combination stored in the buy profile database 6 and sell profile database 8, a mutual satisfaction profile function, which in the representative embodiment is a mutual satisfaction cross product profile. The mutual satisfaction cross product profile represents the potential for that buy/sell pair mutually to satisfy each other at each price and size. By way of example, if there are three buy profiles (A, B, C) and two sell profiles (1, 2), the CMC 2 will calculate six mutual satisfaction cross product profiles, e.g. A1, A2, B1, B2, C1, C2.

At step 110, the CMC 2 ranks each grid element (possible buy/sell pair at a corresponding price and size) of each mutual satisfaction cross product profile in order from largest to smallest. The grid elements are then allocated in the ranked order (step 112), accumulating the price and size for the buyer and seller of each matched transaction (steps 114 and 116). When the maximum size limit for a particular satisfaction density profile is reached, all remaining lower ranked grid elements involving that profile are removed from consideration (steps 122 and 124). If all feasible (i.e., non-zero mutual satisfaction) crosses have not been done (step 118), then control returns to step 112. If all feasible crosses have been completed, then the process is temporarily suspended until the next order is entered or an existing unmatched order is canceled or modified (step 120), upon which control returns to step 108.

To operate the present invention as a continuous crossing network, then control should return to step 108 whenever a new order is entered or an existing order canceled or modified.

Price Discovery

When all feasible matches have been performed and the CMC 2 is awaiting the next profile input (step 120), there will exist a group of unfilled buy satisfaction density profiles and a group of unfilled sell satisfaction density profiles, with no overlap between the two groups. These unfilled buy and sell satisfaction density profiles may be stored in the buy profile database 6 and the sell profile database 8 respectively.

The two-dimensional price/size region between these groups of unmatched profiles, called herein the "spread region," depicts, at each value of size, for each instrument, the spread between the highest non-zero buy satisfaction profile price and the lowest non-zero sell satisfaction profile price. This aggregate of unfilled satisfaction profiles can be regarded as a generalization of the market quotes currently provided by exchanges and market makers, i.e., is a mechanism, if properly utilized according to the present invention, for price discovery. Importantly, proper use of the information represented by the spread region according to the principals of the present invention obviates the need for parasitic pricing inherent in other crossing networks. Moreover, the information represented by the spread region provides a substantially greater price discovery across the full range of trade sizes than is contained in single quotations of best bid and best offering prices and corresponding sizes currently provided by exchanges and market makers.

The present invention can output the spread region as an aggregate density profile. The spread region can have an arbitrary shape, and depends upon the aggregate of unfilled buy and sell satisfaction density profiles existing in the system at a given time. The shape of the spread region, when represented graphically or mathematically, indicates macro-features of the market in a given instrument. For example, a spread region that is narrow at small order sizes and widens at larger order sizes, indicates that the current market is primarily in small "retail" orders, with no large buy orders and sell orders that are close in price. On the other hand, if the spread region narrows at large sizes, this would indicated the presence of one or more large contra parties who are close in price.

Additional information can be overlayed on the aggregate density profile. For example market depth can be indicated by the quantity of non-zero satisfaction density values entered at each price/quantity grid point over all entered satisfaction density profiles. The CMC 2 creates an aggregate density profile, per instrument, according to the principles of the present invention, having grid entries that indicate the number (or count) of non-zero valued buy or sell satisfaction density profiles entries occupying each price/size grid cell. It is noted that the aggregate density profile does not provide information as to the willingness of any individual participant to trade at a particular price/quantity combination, but rather, reflects the aggregate of all participants.

A further attribute of an aggregate density profile is market intensity. The grid entries of the aggregate density profile represent the maximum satisfaction value among those profiles occupying each price/size grid cell. Of course, the display could be modified so that some other statistic relating to the satisfaction values is calculated or aggregated and available for output to a trader (e.g., minimum, average, medium, most frequently occurring, etc.).

Accordingly, the present invention can output to traders, for example, at the trader I/O devices 16, 18, 20, information relating to the spread region enabling sophisticated price discovery about the market. The kind and quantity of information relating to the spread region, the level of detail, and the timing of the output (e.g., immediately or on a delayed basis) will vary between markets, and could depend upon, for example, the requirements of the market and the expectations of the traders.

Figure 9A:
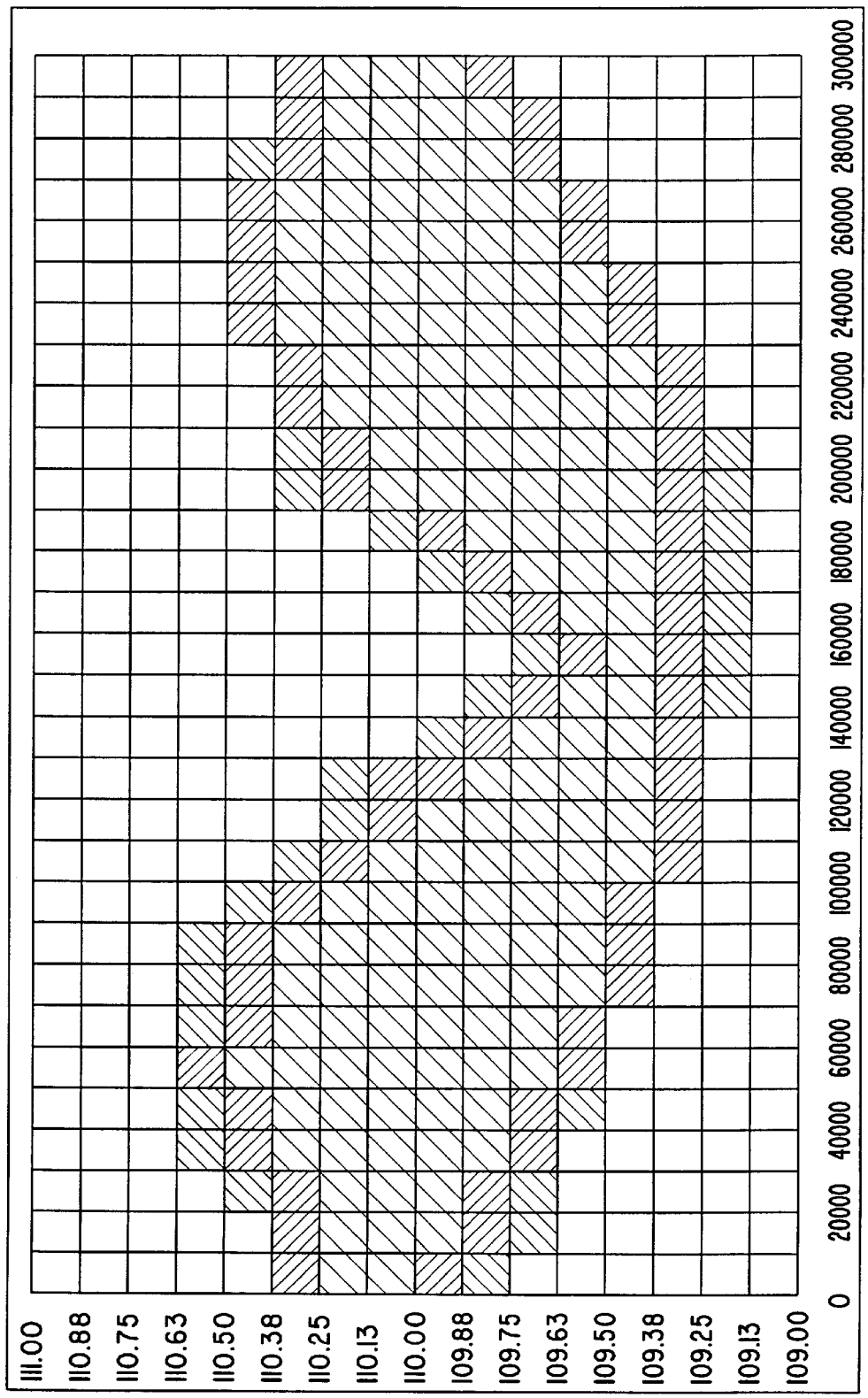

FIG. 9A is an example screen output display showing a typical aggregate density profile. The vertical axis is price and the horizontal axis is quantity. The black grid entries of the aggregate density profile of FIG. 9 represent a maximum satisfaction value of zero and the white grid entries represent a maximum satisfaction of 1. The other shades of colors represent various values between 0 and 1 occupying each price/size grid cell. FIG. 9B is another typical aggregate density profile, except that in FIG. 9B the grid entries are represented by numbers rather than colors.

Additional market characterization data is derived by the present invention by computing various statistics based upon the shape of the spread region. An example is a linear regression fit to the center points of the price spread versus size. It will be apparent that numerous other representations, statistics and shape features can be derived from the aggregate density profile that would fall within the scope of this invention. This information also can be output to traders at trader I/O devices 16, 18, 20. The present invention allows a subset of the above discussed aggregate information to be made available for output, with the timing of such output depending on the circumstance of implementation. For example, the decision as to how much of this information is made public could be determined by market preferences.

Certain aspects of FIG. 8 can be described more precisely in mathematical notation, as follows. This explanation will begin with a batch process description, and then show how this extends directly to a continuous crossing strategy.

Assume we have M buyers and N sellers in a crossing pool for a given stock. We define $B_i(p,s)$ as the "satisfaction density" of the i-th buyer for receiving a portion, s, of his fill at price p, where $0 \leq B_i(p,s) \leq 1$. Along with this profile, the buyer will have a maximum size limit $\beta_i$. Let $S_k(p,s)$ and $\sigma_k$ be the corresponding satisfaction density and size limit for the k-th seller. These satisfaction density profiles are two-dimensional surfaces over a grid of price and size coordinates that characterize the participant's degree of satisfaction in the transaction. A value of zero in any coordinate cell indicates no satisfaction (i.e., no desire for any portion of the transaction to be accomplished at the corresponding cell price), while a value of unity indicates full satisfaction.

In-between values correspond to limited degrees of satisfaction. Mathematically, these values represent "fuzzy" variables that characterize the degree of membership of a particular price/size transaction in the set of satisfying transactions.

Certain characteristics of the satisfaction density functions can be derived from obvious constraints. For a given value of size, we have:

$B_i(p_1,s) \geq B_i(p_2,s)$ if $p_1 < p_2$ (i.e., buyers prefer lower prices), $B_i(p,s) \uparrow 1$ as $p \downarrow 0$ (full satisfaction as price goes to zero), $B_i(p,s) \downarrow 0$ as $p \uparrow \infty$ (no satisfaction as price goes to infinity), and similarly, $S_k(p_1,s) \geq S_k(p_2,s)$ if $p_1 > p_2$ (i.e., sellers prefer higher prices), $S_k(p,s) \uparrow 1$ as $p \downarrow \infty$ (full satisfaction as price goes to infinity), $S_k(p,s) \downarrow 0$ as $p \uparrow 0$ (no satisfaction as price goes to zero).

For a given price p, there is no similar set of ordinal relationships with respect to size. However, there are special cases that typically would arise in trading. For example, the satisfaction density of a market maker at a given price p might be constant for sizes from zero up to 1,000 shares, and then decline rapidly to zero for larger sizes. The satisfaction density of an agency broker might be non-zero only for sizes up to the client's order size. The satisfaction density of an accumulating or divesting investor might exhibit a broad hump in size centered at some large value.

We define the mutual satisfaction density between the i-th buyer and the k-th seller to be $$J_{ik}(p,s) = B_i(p,s) S_k(p,s), \; i=1, \ldots M; \; j=1, \ldots N.$$

This product lies between zero and unity in value, and provides a measure of the relative degree to which a given price and size satisfy a particular pair of buyer and seller. There will be MN such mutual satisfaction densities for all participants in the batch.

Numerous other alternatives for defining these mutual satisfaction densities are available. For example, an alternative definition could be $$J_{ik}(p,s) = \min\{B_i(p,s), S_k(p,s)\}$$

It will be apparent that other definitions are possible that accomplish the same objective of characterizing the degree of mutual satisfaction.

The optimization problem is: what sequential allocation of amounts and prices $$(p_{ik}, a_{ik}) \; i=1 \ldots M; \; j=1 \ldots N$$

between the i-th buyer and the k-th seller maximizes the joint mutual satisfaction over all participants? This is equivalent to maximizing sequentially $$J = \sum_{i=1}^{M} \sum_{k=1}^{N} J_{ik}(p,s)$$

subject to the size constraints $$\sum_{k=1}^{N} s_{ik} \leq \beta_i,$$

$$\sum_{i=1}^{M} s_{ik} \leq \sigma_k.$$

This maximization can be performed as follows:
1. At each price/size value in the grid, compute the MN values of $J_{ik}(p,s)$.
2. Over all price/size grid values, rank the $J_{ik}(p,s)$ from largest to smallest, saving the index values corresponding to both the buyer/seller pair and the grid coordinates.
3. Allocate price and size, starting with the highest ranked $J_{ik}(p,s)$, and accumulate the amounts for each buyer/seller. When a size limit is reached, knock out of the ranked list any remaining entries for that buyer/seller.

Any ties in the ranking process could be arbitrated by earliest time of entry or random drawing in step three, in order to be fair to all participants. Alternatively, where there is a tie, the CMC 2 could select the match that would result in the greatest overall mutual satisfaction over all possible securities being accomplished. For example, the CMC 2 could "look ahead" and determine whether any other possible matches depend upon one of the tied possible matches occurring.

The CMC 2 can then aggregate all allocations between each pair of buyer and seller to compute a single size and price for their transaction as follows:

$$s_{ik} = \sum_m \sum_n s_{ik}(m,n)$$

(total size, where (m,n) are grid point coordinates corresponding to non-zero mutual satisfactions)

$$P_{ik} = \frac{\sum_{m,n} p_{ik}(m,n) s_{ik}(m,n)}{s_{ik}} \; \text{(average price)}.$$

The optimization approach discussed above permits one allocation between a given buyer and seller at a particular price and size, with the allocations over all possible combinations determined sequentially in rank order of mutual satisfaction values. In the limit as the size increment of the satisfaction profile grid goes to zero, there will be an arbitrarily large number of possible allocations within a vanishingly small neighborhood of the highest current mutual satisfaction value, all having essentially the same mutual satisfaction value (assuming only continuity of the satisfaction profile as a function of the size variable within this neighborhood). In this limiting case, the third and final step of the allocation process converges mathematically to the following rule:

3a. For the highest mutual satisfaction value, allocate repeated trades to the corresponding buyer and seller in increments of the corresponding size coordinate until one or the other participants' maximum size limit would be exceeded. Then proceed to the next highest mutual satisfaction value (which may represent a different buyer/seller pair and/or a different price/size coordinate) and repeat this procedure until no feasible matches remain.

In a system that implements the refinement of step 3a., satisfaction density profiles could be represented by analytic functions of the size coordinate, and the calculation of the maxima of the mutual satisfaction density profiles could be performed by standard analytical and/or numerical techniques.

This implementation (which may be regarded as a mathematically limiting case) can be regarded as a generalization of the basic embodiment in cases where the size increment remains greater than zero. In this embodiment, the ranking procedure is used to determine the sequence of allocations, but at the highest current mutual satisfaction value, multiple allocations (as many as the trader specifies) would be permitted for the corresponding buyer/seller/price/size, until one or the other participants' maximum size limit would be exceeded.

In a further embodiment, the user could specify groups of price/size cells, along with corresponding limits on the number of allocations that could be made within each group. As the allocation process proceeds, when one of these limits is reached, the cells in the group become ineligible for subsequent allocations, and thus are skipped over.

The optimization approach discussed above maximizes sequentially the mutual satisfaction at each stage of the allocation process, by assigning allocations based upon the highest remaining mutual satisfaction value. This approach has the virtue of being computationally tractable and generally yielding allocations with tight spreads in price. However, it does not assure a globally optimum allocation assignment, which may be computationally intractable for problems of any great size. The following refinement formally pose the optimization problem in fullest generality, and describes other search techniques that can be used to seek solutions.

Define an allocation C to be an arbitrary collection of points $(p_{ik}(j), s_{ik}(j))$, $i \in [1 \ldots M]$; $k \in [1 \ldots N]$, $j \in C$, taken from the MN mutual satisfaction grids, where the index j runs through the entire allocation C and indexes the individual price/size trade components for all buyer/seller pairs. The indexing scheme on j admits repeated values at any particular buyer/seller/price/size point $(p_{ik}, s_{ik})$, and thus it includes the variations on the allocation rule described above.

Let C' be the set of all feasible allocations, i.e., those which satisfy the following conditions:

1. For any $C \in C'$, $J_{ik}(p_{ik}(j), s_{ik}(j)) > 0$ for all $j \in C$ (i.e., feasible allocations have only non-zero mutual satisfaction values), and 2. For any $C \in C'$, the maximum size constraints $$\sum_{j \in C_i} S_{ik}(j) \leq \beta_i$$

$i = 1 \ldots M; C_i$ = subset of $C$ involving buyer $i$ $$\sum_{j \in C_k} S_{ik}(j) \leq \sigma_k$$

$k = 1 \ldots N; C_k$ = subset of $C$ involving seller $l$ are satisfied for all buyers and sellers (i.e., feasible allocations do not exceed the maximum trade size desired by any buyer or seller).

The general optimization problem then is: what feasible allocation $C \in C'$ maximizes the total mutual satisfaction $$J = \sum_{i=1}^{M} \sum_{k=1}^{N} J_{ik}(p, s),$$

over all participants, while simultaneously maximizing $$V = \sum_{i=1}^{M} \sum_{k=1}^{N} S_{ik},$$

the total trade volume? The objective function for this optimization can in general be a non-linear combination of J and V.

Finding the globally optimum solution to problems of this type generally requires an exhaustive compilation of the set C' of feasible allocations, followed by an exhaustive evaluation of the functions J and V over the entire set C', which, in some cases, may be computationally intractable. A number of alternative approaches are available for finding near-optimum solutions, in addition to the approach described above. These include stochastic algorithms such as random search algorithms, genetic algorithms and evolutionary programming; and multiple hypothesis tree search and other multi-stage deterministic search algorithms. It will be apparent that numerous alternative optimization procedures can be applied to this problem, all of them lying within the principles of the present invention.

The present invention also allows a minimum threshold of mutual satisfaction in the ranking process, below which no allocations are made. Furthermore, the satisfaction density for one stock can be made a function of the allocations already made in another stock.

To convert the batch process into a continuous one, each new satisfaction density entered into the crossing network of the present invention is treated as an event that triggers a new round of computation as described above. While the computation requirements to implement this process in real time for all stocks are significant, they are well within the capability of modern supercomputers.

The following is a simple example to illustrate the operation of the present invention. This example assumes that there are two buy profiles and two sell profiles entered by traders into the system for the trade of a single stock. The four satisfaction density profiles can be represented as the following matrices, with price being rows and quantity being columns:

| Buyer #1 Profile | B1 := | 0 | 0 | 0 | 0 |
|---|---|---|---|---|---|
| | | .1 | 0 | 0 | 0 |
| | | .8 | .7 | .3 | .1 |
| | | 1 | .8 | .4 | .2 |
| Buyer #2 Profile | B2 := | .1 | .1 | .1 | 0 |
| | | .3 | .3 | .3 | 0 |
| | | .5 | .5 | .5 | 0 |
| | | 1 | 1 | 1 | 0 |
| Seller #1 Profile | S1 := | 1 | 1 | 1 | 1 |
| | | .7 | .7 | .7 | .7 |
| | | .2 | .2 | .2 | .2 |
| | | 0 | 0 | 0 | 0 |
| Seller #2 Profile | S2 := | 0 | 0 | 0 | .5 |
| | | 0 | 0 | 0 | .7 |
| | | 0 | 0 | 0 | .3 |
| | | 0 | 0 | 0 | .1 |

Buyer #1 Profile is represented graphically as a contour plot in FIG. 3A. Buyer #2 Profile is represented graphically as a contour plot in FIG. 3D. Seller #1 Profile is represented graphically as a contour plot in FIG. 3C. Seller #2 Profile is represented graphically as a contour plot in FIG. 3B.

Then the four mutual satisfaction cross products produced at step 108 are as follows:

| J11:= (B1 · S1)      |     |     |     |     |
|----------------------|-----|-----|-----|-----|
| J11 therefore equals | 0   | 0   | 0   | 0   |
|                      | .07 | 0   | 0   | 0   |
|                      | .16 | .14 | .06 | .02 |
|                      | 0   | 0   | 0   | 0   |
| J12:= (B1 · S2)      |     |     |     |     |
| J12 therefore equals | 0   | 0   | 0   | 0   |
|                      | 0   | 0   | 0   | 0   |
|                      | 0   | 0   | 0   | .03 |
|                      | 0   | 0   | 0   | .02 |
| J21:= (B2 · S1)      |     |     |     |     |
| J21 therefore equals | .1  | .1  | .1  | 0   |
|                      | .21 | .21 | .21 | 0   |
|                      | .1  | .1  | .1  | 0   |
|                      | 0   | 0   | 0   | 0   |
| J22:= (B2 · S2)      |     |     |     |     |
| J22 therefore equals | 0   | 0   | 0   | 0   |
|                      | 0   | 0   | 0   | 0   |
|                      | 0   | 0   | 0   | 0   |
|                      | 0   | 0   | 0   | 0   |

Figure 10A:
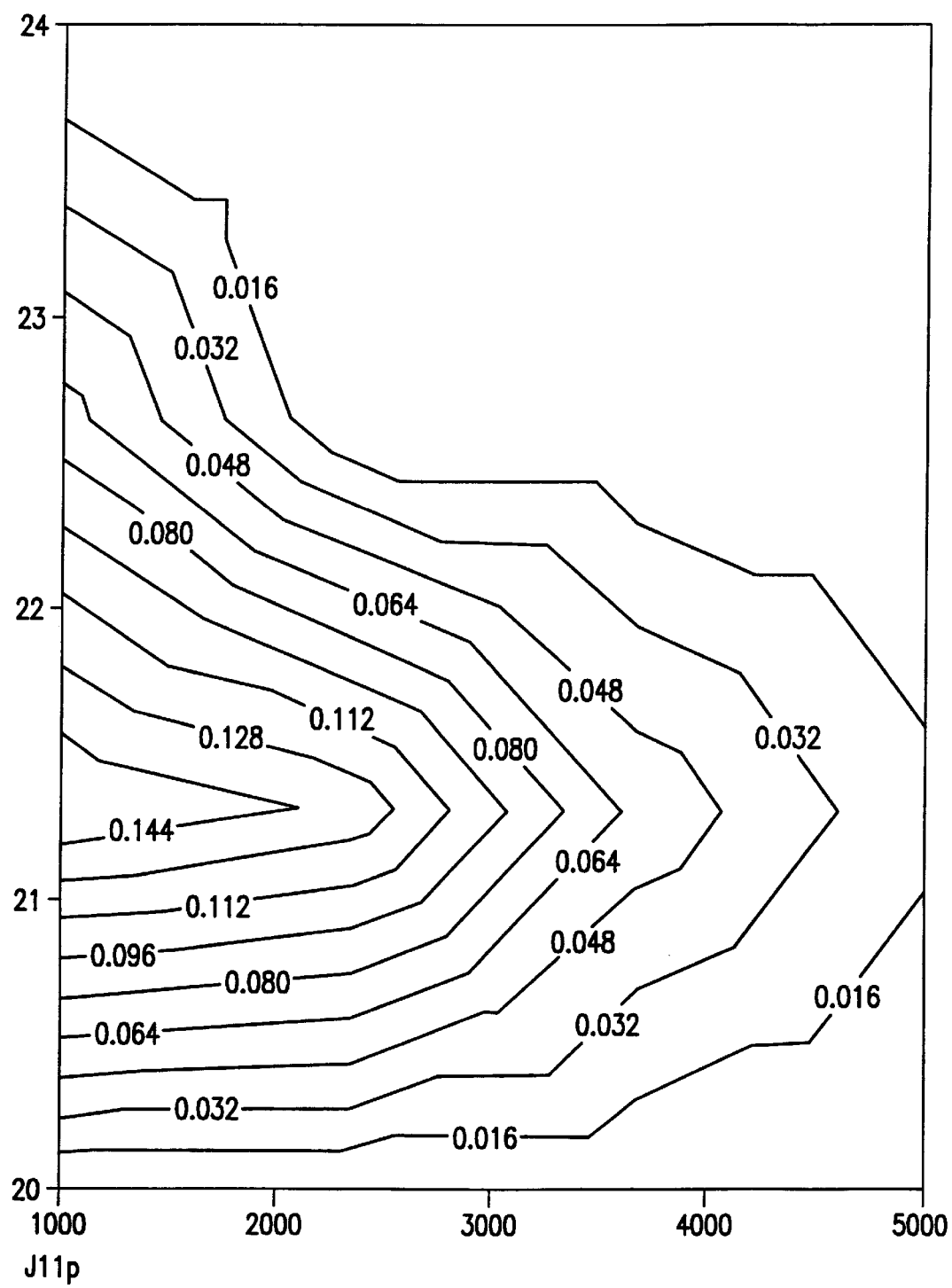
FIGS. 10A to 10C are example mutual satisfaction cross products, represented as contour graphs.
Figure 10B:
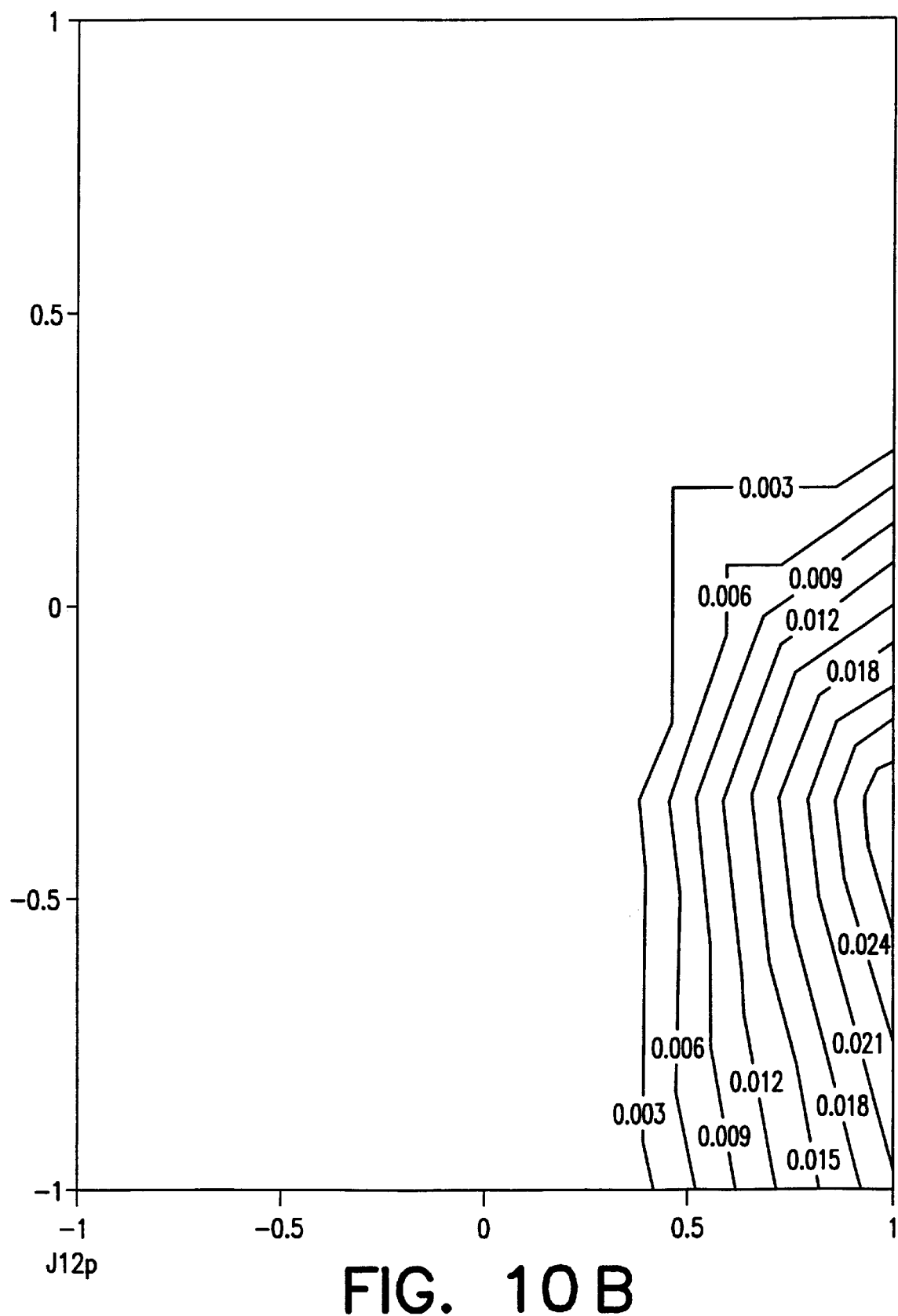
Figure 10C:
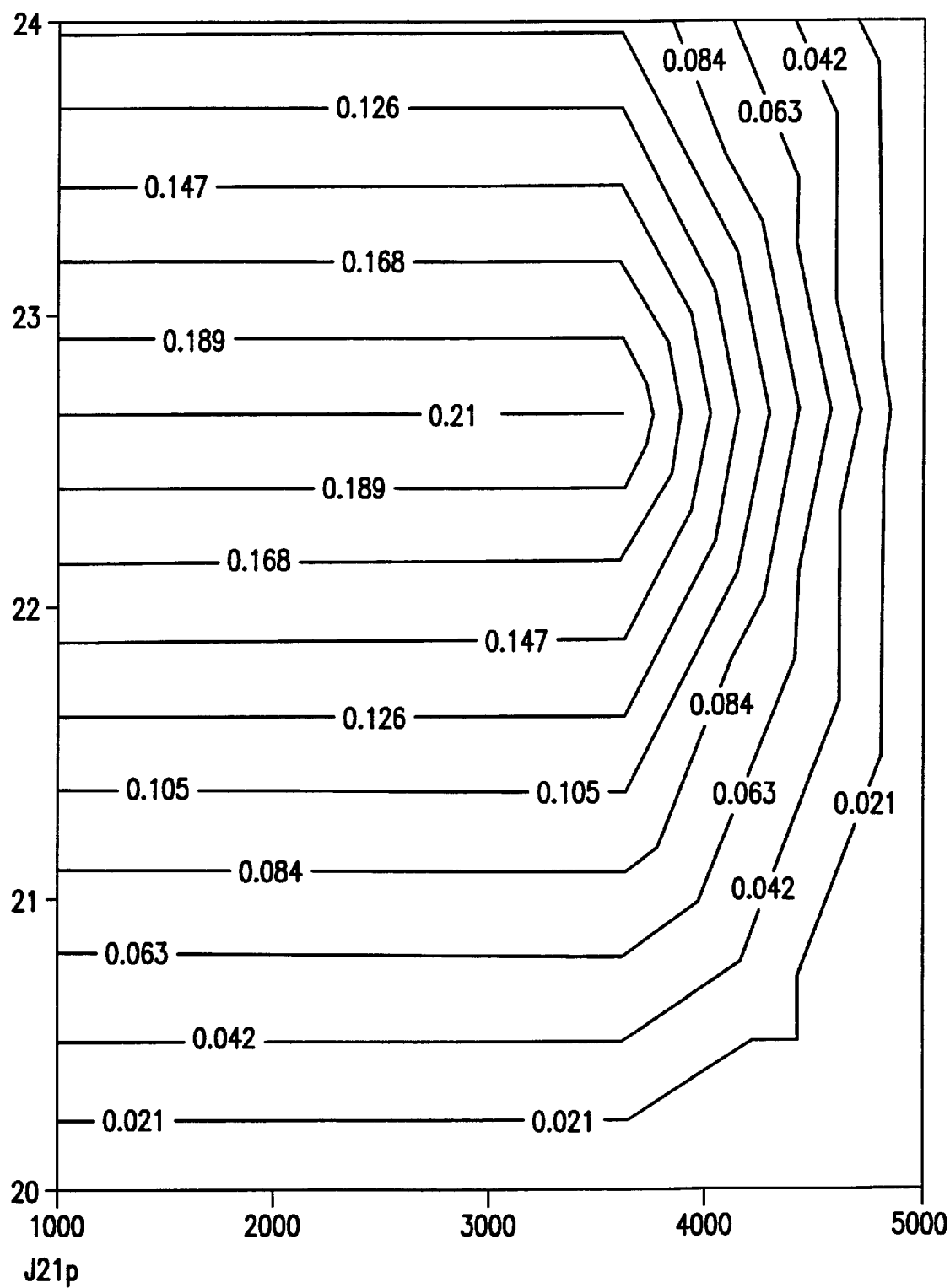

J11 is represented graphically, as a contour plot, in FIG. 10A. J12 is represented graphically, as a contour plot, in FIG. 10B. J21 is represented graphically, as a contour plot, in FIG. 10C. J22 is represented graphically as a blank contour plot (not illustrated).

Ranking each (price, quantity) pair from the above four grids gives the following vector:

w=(0.21, 0.21, 0.21, 0.16, 0.14, 0.1, 0.1, 0.1, 0.1, 0.1, 0.1, 0.07, 0.06, 0.03, 0.02, 0.02, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0)

If there are a number of possible trades ranked equally (e.g., there are three possible trades ranked first above), then the profile with the highest time priority is chosen, or one is chosen at random or, as explained above, according to a predetermined scheme to increase overall mutual satisfaction in the matching process.

The present invention can easily handle trades of baskets of securities. In such case, the CMC 2 will functionally link related satisfaction density profiles. This linking process can be accomplished in its most general form, for example, by matrix manipulation of the two profiles utilizing a connection matrix.

In further embodiments, additional variables (or parameters) can be included that have an effect on the satisfaction density profile. For example, an eligibility variable or an urgency variable (or both) could be set by the trader, as explained below. To further elaborate, consider the following scenarios:

A. A trader has a "buy basket" and a "sell basket" whose execution status cannot become too far unbalanced on either side, in dollars or shares or both.

B. A trader wants to become more (or less) aggressive about buying/selling a given security as a function of the execution status of other securities in the traders' actual/desired basket.

C. Some combination of A. and B. above.

To account for these constraints and relationships, the satisfaction density profile of the present invention can be augmented to include two other variables: eligibility and urgency. In the most general case, each of these variables can take on a value between and including zero and one. Alternatively, each could have a binary value, zero or one. In one embodiment, the eligibility variable has a binary value and the urgency variable has a value between and including zero and one.

Both the urgency variable and the eligibility variable can be associated with the satisfaction density profile as a whole (e.g., one value per variable per profile) or with each coordinate of the satisfaction density profile (e.g., one value for each (price, size) coordinate.)

The eligibility value, when associated with each coordinate, represents the degree to which that grid point is eligible for matching. In the simplest case, the eligibility variable is a binary variable that is used to track execution status, i.e., all values of the eligibility variable are assigned a value of one at order profile entry, and matched values are set to zero upon matching. Thus, in this embodiment, the eligibility variable could keep track of when matches have occurred. In a more general case, the eligibility of unmatched values could be held to zero pending satisfaction of execution status constraints of other securities (e.g., as in scenario A. above). Thus, the eligibility variable could be used as a coupling between two different stocks.

In a most general case, the eligibility variable could be a "fuzzy" variable, having values between and including zero and one, that would allow for "soft" (i.e., continuous-valued) constraints such as "I want to sell [some | a good amount | a lot] of IBM before I buy [ some | much | large amount ] of DEC.

The urgency variable represents the degree to which a particular grid point satisfaction value should be either (a) translated in the direction of a more aggressive price, or (b) warped to a more aggressive satisfaction value, or both. In the representative embodiment, there is one urgency value per satisfaction density profile (i.e., urgency is condensed to a single scalar value for each security, applied uniformly), and the value of the urgency variable ranges from zero to one. In the normal case, the urgency variable would have a value of zero, representing regular trading urgency. Non-zero values of the urgency variable would signify the degree of urgency, with one being the most urgent.

For case (a) immediately above, a non-zero value of the urgency variable would translate the whole satisfaction density profile up in price (for a buy) or down in price (for a sell). In this instance, the boundaries of the satisfaction density profile would shift accordingly.

In case (b), non-zero values of the urgency variable would exponentially warp the satisfaction density values. Assume that the urgency variable is assigned a value u. Then each (non-zero) satisfaction density value is raised to the power $(1-u)$. In this case, the boundaries of the satisfaction density profile are not changed.

Additional embodiments of the present invention enable the incorporation of external variables in the satisfaction density function. "Satisfaction" can be thought of as a normalized bivariate utility function. Unlike the subjectiveness inherent in the classical definition of utility functions, satisfaction in the context of this invention can be regarded as being objectively normalized as a result of the common knowledge among market participants of the precise manner in which their individual satisfaction density profile values will be used in calculations to determine the outcome of matches. In general, satisfaction can be an arbitrarily complex function of a set of variables and/or parameters that, in the aggregate, define the participants' current trading goals within the context of the overall market. This allows the principles of the present invention to be generalized to include trading of both fungible and non-fungible instruments based upon a specification of satisfaction as a function of these external variables.

For example, debt instruments typically are graded on the basis of current interest rate, coupon rate, time to maturity, and quality of issuer. A trader can acquire a portfolio of debt holdings that approximately match a buyer specification by creating a set of satisfaction profiles for individual debt instruments that fall within some range of these variables, where the satisfaction value for a particular instrument at each price and quantity is a function of the above variables.

Higher coupon rates and higher quality of issuer, for example, generally would result in a higher satisfaction value at a given price and quantity.

Accordingly, the present invention allows traders to create and input satisfaction density profiles, where the satisfaction density profile values are a function of or are based upon variables other than price and quantity.

The present invention can also accommodate allocation based constraints. For certain constraints of interest to traders, the eligibility of a buy profile or a sell order profile for execution may be a function of the current allocation computed for their satisfaction density profile. Constraints of this type can be accommodated by employing a repeated stage of all or portions of the allocation computation, as necessary.

For example, step 112 of FIG. 8 can be divided into two stages, the first stage determining the eligibility of each profile entry for execution, and the second stage determining the actual allocation. The same approach can be taken for intermediate values of eligibility (i.e., between 0 and 1), where the value of the eligibility variable is computed in the first stage, and the final allocation is based upon that value of eligibility.

The CMC 2 can be coupled to an automated clearing system and/or accounting system. Orders that are matched can then be automatically output to such system(s) to assist in "backoffice" procedures.

It is noted that the CMC 2 of the representative embodiment of the present invention can be implemented utilizing a logic circuit or a computer memory comprising encoded computer-readable instructions, such as a computer program. The functionality of the logic circuit or computer memory has been described in detail above. Generally, the present invention has practical application as it enables ownership of instruments, such as for example stocks and bonds, to be transferred and facilitates bringing together willing buyers and willing sellers.

Modifications to Accommodate Stock Exchange Rules

Most organized stock exchanges operate with rigid rules as to execution of orders, for example, requiring priority be given to orders exhibiting the best price, regardless of size or any other consideration (such as mutual satisfaction). The present invention, if desired can be implemented to comply with such exchange rules. Thus, variations of the principles discussed above can be made so that the crossing network will accommodate such stock exchange rules. Other such variations are possible within the scope of the invention.

1. Continuous Market Case

When operating in the continuous market mode on an exchange, a new profile entering the system must "sweep" the stock available at a satisfaction value of "one" and a better price, or an equal price in the case of time priority relative to any prospective allocation based on mutual satisfaction.

When the new profile enters the system, the mutual satisfaction cross products are calculated with respect to contra profiles, and the ranking procedure of the basic algorithm is performed. The highest-ranked price/size cell becomes a tentative first allocation. Before making the allocation, however, the CMC 2 first checks to see if there are any contra profiles exhibiting a "one" value of satisfaction (a) at a better price and lower size, or (b) at an equal price, lower size and having time priority, over the contra profile involved in the tentative allocation. If so, the trades from these profiles are aggregated to determine the total size available at an equal or better price. These trades get priority for matching with the new profile over the tentative allocation. The aggregate size may not be equal to the size of the tentative allocation. If the new profile has a satisfaction value of zero at the smaller size and the corresponding aggregate average price, and/or if the tentative contra party is unwilling to accept the residual amount, then the tentative allocation is invalidated. Should no trade result after all tentative allocations have been exhausted, the new profile will be eligible for a retry after subsequent new profiles are executed.

Figure 11:
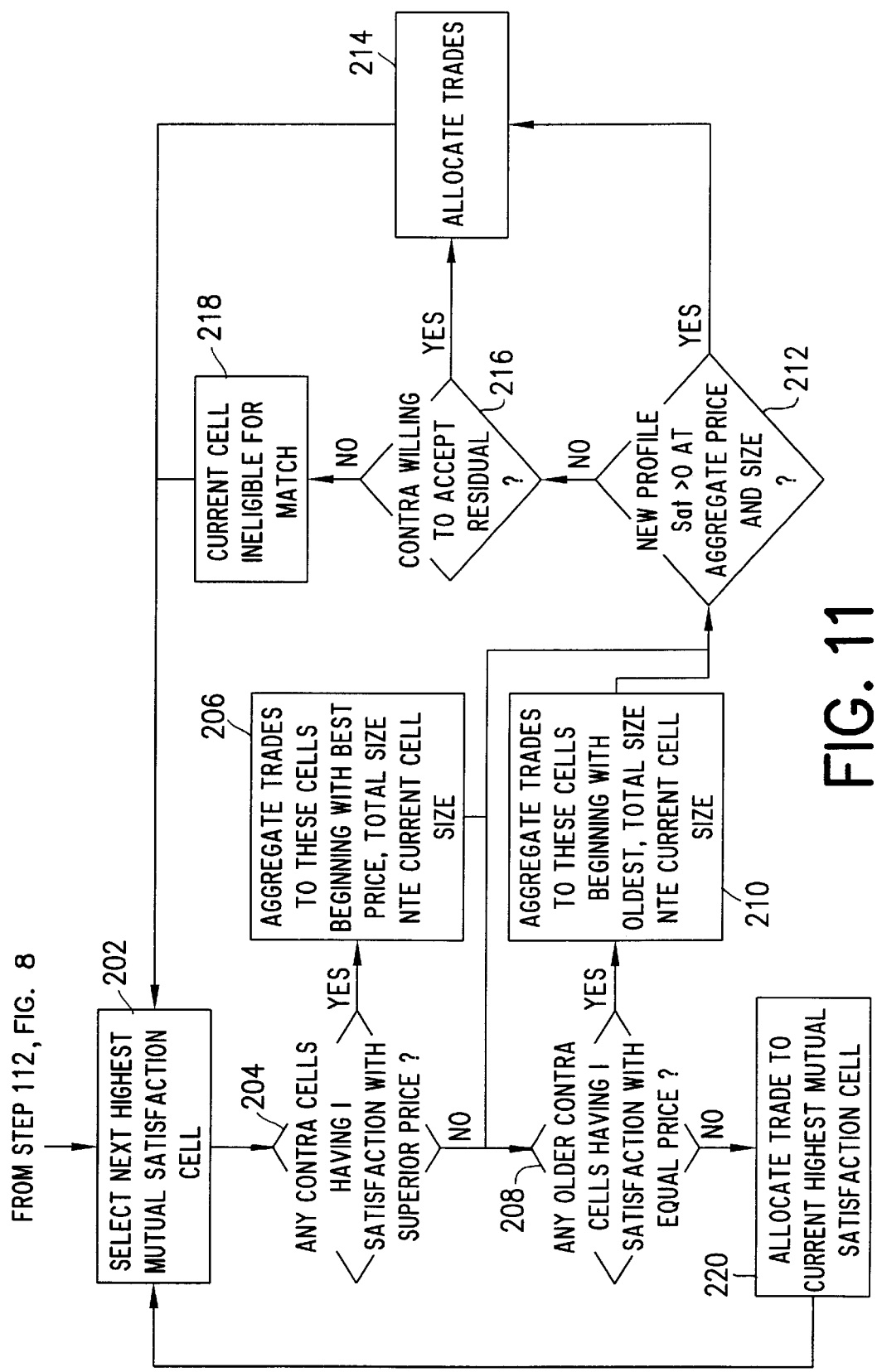
FIG. 11 illustrates an example procedure, in flow chart form, for modifying the present invention to comply with stock exchange rules in a continuous market case.

This procedure is summarized in FIG. 11. At step 202, the CMC 2 selects the next highest mutual satisfaction grid point. The CMC 2 then determines at step 204 if any contra satisfaction density profiles exist in the system that have a "1" satisfaction at a better price. If so, at step 206 the CMC 2 aggregates these possible trades to determine the total size available at the better price, and these trades get priority for matching at step 212. A similar process is performed at steps 208 and 210 for trades having equal price but time priority. If the aggregate size is greater or equal to the size of the tentative allocation (step 212), then the trade is allocated accordingly (step 214). Otherwise, at step 216, if the tentative contra party is unwilling to accept the residual amount (step 216), then the tentative allocation is invalidated (step 218). If the tentative contra party is willing to accept the residual amount, then a trade is allocated accordingly (step 214). If no unmatched contra cell exists that has a superior or equal price, then the trade is allocated to the highest-ranked price/size cell (step 220).

In addition to the above situation, the case may arise where a new profile does not overlap with any existing profiles, but there are prices where both the new profile and existing contra profiles have "one" satisfaction values, with the existing profiles having these values at lower sizes. In this case, the CMC 2 sweeps the lower-size existing stock to fill any eligible "one" satisfaction values in the new profile (using price, entry time and size priority, in that order). The final price may be allocated either on a "walking the book" basis, where each contra side is filled at the individual prices of each cell, or all contra cells may be filled at the best price needed to complete the fill.

2. Call Market Cases

There are twelve different cases that must be considered, corresponding to each of the combinations set forth below:

single-price and multi-price calls no market orders, exactly offsetting market orders, and non-offsetting market orders, non-overlapping limit profiles and overlapping limit profiles.

The following procedures are used in these cases.
Single-Price Calls

Single price calls require that profiles having a better price, at a "one" satisfaction value, relative to the call price be given priority. We define the price deviation of a given profile to be the amount by which its best price at any size and at a "one" satisfaction value deviates from the call price. Priority is then given to profiles whose price deviations are greater than or equal to zero, i.e., that are willing to improve on the call price at a "one" satisfaction value. Those profiles with a strictly positive price deviation must be filled completely in the call, while those with zero price deviation may not necessarily receive a complete fill. Table 1 lists the procedures to be used under various situations.

TABLE 1

| Market Order Situation | Non-Overlapping Limit Profiles | Overlapping Limit Profiles |
| --- | --- | --- |
| None | No-Op | Find the call price that 1) fills all profiles having a strictly positive price deviation, in price deviation priority, and 2) yields the highest mutual satisfaction-weighted volume on the total transaction. Break any ties by selecting the call price yielding the largest total volume, then use random draw. Fill all remaining eligible limit profiles at the call price in order of mutual satisfaction and then time priority. |
| Non-Offsetting | Form a binary profile with maximum size equal to the offset. Slide this profile into the contra limit profiles, aggregating trade sizes at cells where contra satisfaction equals one (in time priority) until the offset size is met. Fill all market orders and the involved limit orders at that maximum or minimum price. | Form a binary profile with maximum size equal to the offset, and include it with the corresponding buy or sell limit profile groups at first priority. Find the call price that: 1) fills all profiles having a strictly positive price deviation priority, and 2) yields the highest mutual satisfaction-weighted volume on the total transaction. Fill the market profile and all eligible limit profiles at that price. Fill all remaining eligible limit profiles at the call price in order of mutual satisfaction and then time priority. |
| Exactly Offsetting | Form binary buy and sell profiles with maximum size equal to the market order aggregates. Perform the above procedure for each profile against contra buy/sell limit profiles. Fill all market orders at the average of the two prices determined by this procedure. | Use same price as determined in the no market order case to fill the offsetting market orders. |

Multi-Price Calls

The multi-price call allows for different prices, so priority is determined by mutual satisfaction, as in the basic algorithm discussed above. Alternatively, one may employ the continuous market sweep algorithm described above as an additional sub-procedure on the basic algorithm.

The above described embodiments are merely illustrative of the principles of the present invention. Other embodiments of the present invention will be apparent to those skilled in the art without departing from the spirit and scope of the present invention. Table 2 lists the procedures to be used under various situations.

TABLE 2

| Market Order Situation | Non-Overlapping Limit Profiles | Overlapping Limit Profiles |
| --- | --- | --- |
| None | No-Op | Use the basic algorithm, with the option of using the continuous market sweep modification. |
| Non-Off setting | Form a binary profile with maximum size equal to the offset. Slide into the contra limit profiles, aggregating size where contra satisfaction equals one (in time priority) until the offset size is met. Fill all market orders at the volume-weighted average price (VWAP) over the aggregated cells, and fill the involved limit orders at their | Form a binary profile with maximum size equal to the offset, and include with the corresponding buy or sell limit profile groups at top priority. Execute the basic algorithm (optionally with the continuous market sweep mod), sliding the market profile as necessary to find the price that just fills the market profile against contras with satisfaction equal to one. Fill all market |

TABLE 2-continued

| Market Order Situation | Non-Overlapping Limit Profiles | Overlapping Limit Profiles |
|---|---|---|
| | corresponding cell prices. | orders at the resulting VWAP. Limit orders are filled at whatever outcome results from the basic algorithm. |
| Exactly Offsetting | Form binary buy and sell profiles with maximum size equal to the market order aggregates. Perform the above procedure for each profile against contra buy/sell limit profiles. Fill all market orders at the average of the two prices determined by this procedure. | Use the basic algorithm (optionally with the continuous market sweep mod) to cross the overlapping limit profiles. Then calculate the MSVWAP (mutual satisfaction-volume weighted average price) from the results, and fill the offsetting market orders at this price. |

What is claimed is:

1. A crossing network that matches orders for instruments where the orders are represented by a satisfaction density profile, the crossing network comprising:

a plurality of terminals for entering orders in the form of a satisfaction density profile that represents a degree of satisfaction to trade an instrument at a plurality of (price, quantity) combinations, each satisfaction density profile representing either a buy order or a sell order for the instrument; and a matching controller computer coupled to each one of the plurality of terminals over a communications network and receiving as input each satisfaction density profile entered at each one of the plurality of terminals, the matching controller computer matching, where possible, satisfaction density profiles representing buy orders with satisfaction density profiles representing sell orders, and thereafter comparing unmatched satisfaction density profiles representing buy orders for one or more predetermined instruments with unmatched satisfaction density profiles representing sell orders for corresponding one or more predetermined instruments to obtain spread information for each one or more predetermined instruments.

2. The crossing network of claim 1 wherein the matching controller computer further comprises:

means for pairing each satisfaction density profile representing a buy order with each satisfaction density profile representing a sell order;

means for calculating for each satisfaction density profile pair a mutual satisfaction function, each mutual satisfaction function including a plurality of (price, quantity) combinations representing a degree of mutual satisfaction for trading said quantity at said price;

means for ranking according to the degree of mutual satisfaction every (price, quantity) combination of every mutual satisfaction function; and means for matching, in accordance with the ranking, buy orders with sell orders.

3. The crossing network of claim 1 wherein the spread information is represented as a two-dimensional graph having a price axis and a quantity axis.

4. The crossing network of claim 1 further comprising means for outputting the spread information in graphical form.

5. The crossing network of claim 1 further comprising means for outputting the spread information in statistical form.

6. The crossing network of claim 1 wherein satisfaction density profile is a two-dimensional graph having a price axis and a quantity axis.

7. The crossing network of claim 1 wherein the satisfaction density profile is entered at the terminal as a contour graph.

8. The crossing network of claim 1 wherein the satisfaction density profile is entered at the terminal as a temperature graph.

9. The crossing network of claim 1 wherein each satisfaction density profile includes a satisfaction density value for each (price, quantity) combination.

10. A crossing network that matches orders for instruments where the orders are represented by a satisfaction density profile, the crossing network comprising:

a plurality of terminals for entering orders in the form of a satisfaction density profile that represents a degree of satisfaction to trade an instrument at a plurality of (price, quantity) combinations, each satisfaction density profile representing either a buy order or a sell order for the instrument; and a matching controller computer coupled to each one of the plurality of terminals over a communications network and receiving as input each satisfaction density profile entered at each one of the plurality of terminals, the matching controller computer matching, where possible, satisfaction density profiles representing buy orders with satisfaction density profiles representing sell orders, the matching controller computer aggregating information from each entered satisfaction density profile to obtain an aggregate density profile.

11. The crossing network of claim 10 wherein the aggregate density profile is represented as a two-dimensional graph having a price axis and a quantity axis.

12. The crossing network of claim 11 wherein the aggregate density profile is a market depth profile representing quantities of non-zero (price, quantity) combinations entered at each (price, quantity) coordinate for all satisfaction density profiles relating to a predetermined instrument.

13. The crossing network of claim 10 wherein the matching controller further comprising means for giving priority to satisfaction density profiles exhibiting a best price regardless of quantity.

14. The crossing network of claim 10 further comprising means for outputting the aggregate density profile in statistical form.

15. The crossing network of claim 10 wherein each satisfaction density profile is a two-dimensional graph having a price axis and a quantity axis.

16. The crossing network of claim 10 wherein each satisfaction density profile includes a satisfaction density value for each (price, quantity) combination.

* * * * *